United States Patent
Shinkawa et al.

[19]

[11] Patent Number: 6,154,422
[45] Date of Patent: Nov. 28, 2000

[54] POWER-GENERATING DEVICE, CHARGING METHOD AND CLOCKING DEVICE

[75] Inventors: Osamu Shinkawa; Teruhiko Fujisawa; Akihito Uetake, all of Suwa, Japan

[73] Assignee: Seiko Epson Corporation, Tokyo, Japan

[21] Appl. No.: 09/020,702

[22] Filed: Feb. 9, 1998

[30] Foreign Application Priority Data

Feb. 7, 1997 [JP] Japan .................................. 9-025680
Dec. 24, 1997 [JP] Japan .................................. 9-355735

[51] Int. Cl.[7] .............................. G04B 1/00; G04C 3/00; H02N 7/217; G05F 1/40
[52] U.S. Cl. ......................... 368/204; 320/166; 323/222; 323/282; 363/89; 363/127
[58] Field of Search ....................... 368/64, 66, 203–205; 323/222, 282, 281, 288; 363/83, 89, 127; 320/166, 167, 101, 102

[56] References Cited

U.S. PATENT DOCUMENTS

| 4,519,024 | 5/1985 | Federico et al. ........................ 363/127 |
| 5,001,685 | 3/1991 | Hayakawa ............................... 368/204 |
| 5,130,960 | 7/1992 | Hayakawa ............................... 368/204 |
| 5,510,972 | 4/1996 | Wong ....................................... 363/127 |
| 5,835,456 | 11/1998 | Farine et al. .............................. 368/66 |
| 5,866,278 | 10/1998 | Ohshima et al. ........................ 368/204 |
| 5,982,157 | 11/1999 | Wattenhofer et al. . |

FOREIGN PATENT DOCUMENTS

| 6-300865 | 10/1994 | Japan . |
| 9-131064 | 5/1997 | Japan . |
| WO 97/24795 | 7/1997 | WIPO . |

Primary Examiner—Vit Miska
Attorney, Agent, or Firm—Stroock & Stroock & Lavan LLP

[57] ABSTRACT

A power-generating device can include a dynamo for converting kinetic energy into electrical energy, a switch capable of short-circuiting output terminals of the dynamo, a controller capable of controlling the switch, a rectifier for rectifying an output of the dynamo, and a charging portion capable of storing the output of the dynamo. The controller can perform chopper control for cyclically turning on and off the switch in accordance with a PWM signal. Where an electromotive voltage of the dynamo is lower than a charged voltage, a boosted voltage can be produced by chopper amplification. If the electromotive voltage is low, it can be charged in the charging portion if the boosted voltage is increased to a sufficient level prior to charging.

28 Claims, 14 Drawing Sheets

POWER-GENERATING DEVICE, CHARGING METHOD AND CLOCKING DEVICE

BACKGROUND OF THE INVENTION

Field of the Invention

The present invention relates to a power-generating device having a power generator provided with a dynamo coil that generates electricity by capturing the kinetic energy produced when a rotor is rotated by a rotating weight or the like, and to a clocking device using such a power-generating device.

In recent years, timing devices, such as wristwatches, have been developed with built-in electricity generators that convert the energy generated by the movement of the user's arm into electricity used to drive the stepping motor of the device. As such, timing devices with such built-in electricity generators have eliminated the need to change the battery, which is often a cumbersome process. Furthermore, and more importantly, where the need for a battery is eliminated, the need to dispose of the used, potentially hazardous battery is also eliminated. As a result, the economic and environmental advantages offered by built-in electricity generators make them particularly desirable for use in wristwatches and similar devices.

One example of a conventional portable electronic device is depicted in FIG. 1. Clocking device 401 includes a power-generating device 409 and a rotating weight 411 arranged to turn within a case of clocking device 401. The turning movement of rotating weight 411 is transmitted to a rotor 413 of a dynamo 410 via a wheel train mechanism 412. As rotor 413 rotates, an electromotive voltage is generated in a dynamo coil 415 provided on a stator 414. An alternating current output from dynamo 410 is rectified by a rectifying portion 402 that includes a rectifier diode 402a, and is then charged in a charging portion 404 that includes a large-capacity capacitor 405. Rectifying portion 402 may be a rectifier circuit, such as a full-wave rectifier circuit or a voltage doubling rectifier circuit.

A functioning device 406, such as a timepiece 407, can be operated by utilizing electric power from charging portion 404 of power-generating device 409. Dynamo 410 comprises rotor 413, which may be a disk-shaped, bipolar permanent magnet, and stator 414, which is attached to rotor 413. Rotation of rotor 413 generates an electromotive voltage in dynamo coil 415 of stator 414, which is output from dynamo coil 415 as an alternating current.

In the conventional power-generating device 409 described above, however, when capacitor 405 of charging portion 404 is charged to a certain voltage value, the electromotive voltage generated in dynamo coil 415 cannot be charged in the large-capacity capacitor 405, unless the electromotive charge is greater than a charged voltage value of capacitor 405. Thus, in many cases, kinetic energy caught by rotating weight 411 cannot be converted efficiently into electrical energy.

FIG. 2 shows one example of movement of rotating weight 411 of clocking device 401. Assume now that, as shown in FIG. 2(a), rotating weight 411 is set to lie in a vertical plane, and after being raised to its uppermost position (180 degrees), rotating weight 411 is acted upon by gravity. At this position, when rotating weight 411 is acted upon by gravity, one of two events occurs: (1) rotating weight 411 stops at a position of zero degrees, as shown in FIG. 2(b); or (2) rotating weight 411 overshoots the position of 0 degrees by several degrees or more, as is shown in FIG. 2(c). In the case depicted in FIG. 2(b), all of the potential energy stored in rotating weight 411, when rotating weight 411 is positioned at 180 degrees, is converted into kinetic energy when rotating weight 411 is acted upon by gravity, and is captured as electrical energy, when rotating weight 411 stops at position of 0 degrees (less mechanical losses produced by, for example, by the bearing and wheel train mechanisms of the rotor).

In contrast, in the case depicted in FIG. 2(c), when rotating weight 411 has dropped by the force of gravity and reached the position of 0 degrees, rotating weight 411 still has kinetic energy stored therein and therefore overshoots beyond the position of 0 degrees by several degrees or more. Stated otherwise, at a position of 0 degrees, not all of the kinetic energy is converted into electrical energy, as a part of the kinetic energy remains stored in rotating weight 411. In the case of FIG. 2(c), the overshoot of rotating weight 411 repeats damped oscillation and the weight 411 gradually settles to the position of 0 degree. At this time, the kinetic energy stored in rotating weight 411 has been consumed incrementally by mechanical losses produced by, for example, bearing and wheel train mechanisms of the rotor, and correspondingly the electromotive voltage charged as a result of the induction of voltage into dynamo coil is gradually reduced. Therefore, the kinetic energy stored in rotating weight 411 is in not efficiently converted into electrical energy for charging charging portion 404.

Accordingly, once charging portion 404 is charged to a certain level, it has been conventional that when rotating weight 411 is acted upon by gravity or captures a motion of the user of wrist watch device 401, and the electromotive voltage generated in dynamo coil 415 by such force is so small that it does not exceed the charged voltage of charging portion 404, no attempt is made to store the kinetic energy of rotating weight 411.

Further, as a practical matter, where clocking device 401 is used as a wrist watch, it is rare that a user's wrist motion rotates rotating weight 411 in one direction from its uppermost position as is the case depicted in FIGS. 2(a) and 2(b), because a user's wrist motion is typically a continuous motion. Therefore, as shown in FIG. 2(c), when the charged voltage of charging portion 404 becomes sufficiently high, and the potential difference between the charged voltage and the electromotive voltage generated in dynamo coil 415 is small, a user's wrist motion often causes rotating weight 411 to rotate in the direction of arrow B, opposite to the direction rotating weight 411 rotated initially, as is indicated by arrow A. Thus, where the wrist motion is continuous, the kinetic energy provided to rotating weight 411 is reduced as a result of the canceling effect of the forces depicted by arrows A and B. This makes it difficult to produce electric power by catching the motion of the user's wrist or the like with high efficiency.

On the other hand, when the electromotive voltage generated in dynamo coil 415 is sufficiently larger than the charged potential of charging portion 404, a high charging brake has been applied to rotating weight 411 so as to decrease the speed with which rotating weight 411 rotates. In this case, the kinetic energy caught by rotating weight 411 through one stroke of drop motion can be captured as electrical energy very efficiently. However, the time required for a charging process to be completed is delayed because of the time it takes rotating weight 411 to complete one stroke of drop motion. Further, as is mentioned above, the motion of the user's wrist rarely ceases at the time rotating weight 411 completes one stroke of drop by gravity; to the contrary, the motion is typically a continuous motion. Accordingly, even if a large amount of charge is obtained with one stroke of drop motion of rotating weight 411, the charging time may be so long that the movement of rotating weight 411 which rotates based on wrist motion, would have to be prevented from following the continuous wrist motion to proceed in the same direction for such a long period. Therefore, because rotating weight 411 cannot efficiently catch the kinetic energy of the wrist motion, the efficiency of converting the wrist motion into electrical energy is reduced.

One example of a prior art device is shown in Japanese Unexamined Patent Publication No. 6-300865, which describes an electronic watch having a power-generating device that converts mechanical energy into electrical energy by utilizing the motion of the human body or gravity. In this case, as described above, the weight is moved by the movement of a human body, and that movement is transmitted through a gear train, which in turn moves a magnet of a generator relative to the generator coil. The movement of the magnet is detected to control the amount of load applied to the magnet upon power generation by the power-generating device. Specifically, the reference discloses that the electromotive voltage generated by a dynamo is compared with the charged voltage of a capacitor serving as an electricity accumulating member, and a transistor is provided to connect or disconnect the dynamo coil to the capacitor or load. With the provision of such a transistor switch, when the transistor permits electricity to be conducted (in its closed position), a charging current flows to generate a charging brake applied to the rotating weight, whereas when the transistor does not permit electricity to be conducted (in its open position), no charging current flows and a load, such as a charging brake, is not applied to the rotating weight. Accordingly, the charging efficiency can be improved by properly controlling those two conditions.

When the input motion applied to rotating weight 411 is so small that no electricity can be charged with an ordinary rectifier circuit, the transistor is set open to reduce the load of rotating weight 411, causing rotating weight 411 to freely turn. Conversely, when a large input motion is applied to rotating weight 411, the transistor is set to be closed to allow electricity to be conducted. By controlling the transistor in this manner, when the transistor is open when the input motion is small, the kinetic energy of rotating weight 411 is not used for charging of electricity and no charging brake is applied to rotating weight 411. As such, rotating weight 411 continues in a state of motion with kinetic energy remaining stored therein. A portion of the kinetic energy stored in rotating weight 411, however, is consumed by mechanical losses. Further, the kinetic energy provided to rotating weight 411 upon the continuous motion of the user's wrist is consumed as a result of canceling or offset forces in the directions of the arrows A and B (FIG. 2(*c*)) when the direction of rotation is changed by the user's motion. Accordingly, even under the above control, when the kinetic energy is small and the electromotive voltage of dynamo coil 415 is not greater than the voltage charged in the capacitor, charging of electricity is ineffective.

Conversely, when an input motion applied to rotating weight 411 is large (and hence would supply a large electromotive voltage), it is also possible to control the transistor to be set in an open position by permitting rotating weight 411 to freely turn without being impeded by a load. In this case, while the transistor permits electricity to be conducted only when a relatively small input motion is applied to rotating weight 411. This control permits the storage of a greater amount of kinetic energy in rotating weight 411, and reduces the charging brake applied to rotating weight 411 when a large amount of charge is charged as electrical energy, because electricity is charged in the capacitor only during the period in which the transistor permits electricity to be conducted. With the above control, however, the amount of charge itself is reduced. Specifically, the large amount of charge that could be obtained when a large input motion is applied to rotating weight 411 is reduced to a level comparable to that achieved with a small input motion of rotating weight 411, because the end of the dynamo coil is kept disconnected from the capacitor during the large input motion. Also, regardless of whether the transistor permits electricity to be conducted, charging of electricity cannot be effected when the electromotive voltage of the dynamo coil is less than the voltage charged in the capacitor. Thus, even when the above-mentioned control is employed, it is difficult to efficiently produce electrical energy for charging the capacitor by converting the kinetic energy of rotating weight 411.

The above explanation is equally applicable to any type of power-generating device where an electromotive voltage is produced in a dynamo coil by catching kinetic energy provided by forces other than a rotating weight, such as a spring or wind. Therefore, despite having the ability to convert the kinetic energy provided by the very user of a portable clocking device, where the device contains a power-generating device that serves as its power supply, electricity is ineffectively charged if the input motion provided is slight. As a result, the clocking device may fail to operate or operate unreliably.

Accordingly, it is desirable to provide a power generating device that overcomes the drawbacks of the prior art.

SUMMARY OF THE INVENTION

Generally speaking, in accordance with the invention, a power-generating device is provided for converting kinetic energy into electrical energy for charging a capacitor. An electromotive voltage generated by a power generator can be chopper-amplified to produce a higher voltage than a charged voltage, and output terminals of the power generator can be short-circuited intermittently to prevent a charging brake from being needlessly applied to a rotating weight.

More specifically, a power-generating device of the present invention can include a power generator including a dynamo coil, a switch capable of short-circuiting the output terminals of the power generator, a controller capable of controlling the switch, a rectifying portion for rectifying an output of the power generator, and a charging portion capable of accumulating rectified electric power. The controller can include a chopper control function capable of cyclically turning the switch on and off. The power generator can produce electrical power when the dynamo coil catches magnetic flux fluctuations when kinetic energy is imparted to the rotating weight or the like. Further, in a portable power-generating device, electrical power can be produced by capturing energy produced by various forms of motion and vibration, such as those produced by the user's body, wind or vehicles.

In addition, by turning the switch on and off at a predetermined cycle, the electromotive voltage of the dynamo coil can be increased through chopper boosting with the aid of inductance of the dynamo coil of the power generator, i.e., energy stored in the dynamo coil. Accordingly, even when the kinetic energy of the rotating weight is too small to provide an electromotive voltage greater than the charged voltage of the charging portion, the electromotive voltage can be increased through chopper-boosting to a level that effects charging of the converted kinetic energy into electrical energy. Thus, when the electromotive voltage is less than the charged voltage, the kinetic energy caught by the rotating weight or the like is not merely consumed as mechanical losses. A portion of that kinetic energy can be extracted as electrical energy, resulting in improved power generation efficiency.

The chopper boosting operation can be carried out such that during the period that the rotating weight undergoes useless movement, such as during overshooting, both terminals of the dynamo coil are permitted to conduct electricity (i.e., short-circuited) so as to accumulate or charge kinetic energy stored in the rotating weight in the inductance of the dynamo coil as electrical energy. At this time, because a short-circuiting current flows through the dynamo coil, a charging brake can be applied to suppress the overshooting of the rotating weight. Then, by making both terminals of the dynamo coil not electrically conducted, the electrical energy stored in the dynamo coil can be extracted in a spike-like boosted voltage and charged in the charging portion.

Such a sequence of chopper boosting operation can also effectively reduce the offset phenomenon of kinetic energy generated during a continuous motion. Thus, since an appropriate charging brake is applied to the rotating weight by charging electricity while repeatedly short-circuiting both terminals of the dynamo coil, kinetic energy of the rotating weight is less frequently offset during its continuous motion and the efficiency of catching a user's motion and converting kinetic energy into electrical energy can be improved.

The switch can consist of any type of switching elements that can be electrically conducted (turned on) and not electrically conducted (turned off), such as bipolar transistors or MOSFETs. The switch can be blocked from being electrically conducted in the direction opposite the direction that the rectifying portion electronically conducts. To ensure that the switch does not conduct in a direction opposite that of the rectifying portion, a polarity determining portion can be provided for determining the polarity of the electromotive voltage of the power generator so that the switch can be activated and deactivated at the proper time, or, a diode can be connected in series to the switching element.

The chopper control can be used to produce a high electromotive voltage at all voltage values, regardless of the magnitude of kinetic energy imparted to the rotating weight. To reduce the power consumed by the switch for chopper control, however, chopper control can be terminated when kinetic energy is obtained at a level that enables charging without boosting. For this reason, the controller can determine the electromotive voltage of the power generator, and stop the chopper control function when the charging portion can be charged with the electromotive voltage of the power generator. Thus, when the electromotive voltage generated, in the dynamo coil exceeds the charged voltage of the charging portion, the charging portion can be charged with the electromotive voltage without the boosting. By stopping the chopper control in such a case, a charging brake otherwise produced upon short-circuiting both terminals of the dynamo coil is not applied to the rotating weight. Also, when the chopper control is stopped, the electromotive voltage is not boosted, and the difference in potential between the charged voltage of the charging portion and the electromotive voltage supplied from the dynamo coil is not increased. Accordingly, unnecessarily prolonged charging time can, be prevented. Thus, a determiner can be provided to determine the value of the electromotive voltage so that a normal rectifying operation enables the electromotive voltage to be boosted during periods of small kinetic energy (which could not be used to charge during normal rectifying operation) by chopper amplification, while reducing useless movements of the rotating weight such as overshooting. In this manner, kinetic energy imparted to the rotating weight can be effectively stored and converted into electrical energy. As a result, useless movements of the rotating weight can be reduced without reducing kinetic energy imparted thereto, and the kinetic energy can be converted into electrical energy with high efficiency.

To determine whether the electromotive voltage should undergo chopper amplification, the determiner can compare the electromotive voltage of the power generator with the charged voltage of the charging portion. Also, the electromotive voltage of the power generator can be compared with a predetermined first setting or reference voltage at which the electromotive voltage is judged to be able to effect charging. The reference voltage may be provided by a voltage that does not depend on the charged voltage, for example, the breakdown voltage of a Zener diode. Furthermore, the determiner can determine the electromotive voltage of the power generator by detecting a voltage drop across, for example, a diode or a resistor in a power supply circuit with respect to the charging portion.

In addition, when the controller determines that the charged voltage exceeds a second reference voltage, beyond which the charged voltage is judged to be excessive, the controller may activate a switch that prevents any further charging of the capacitor. This arrangement can be used for protection against an overvoltage.

The rectifying portion of the power-generating device of the present invention may employ any suitable rectification method, such as half-wave, voltage doubling or full-wave rectifier. When the rectifying portion performs full-wave rectification by a combination of rectifier diodes and rectifier switches connected upstream and downstream of output terminals of the power generator, the above-mentioned chopper control can be achieved by providing the controller with a polarity-determiner capable for determining the polarity of the electromotive voltage of the power generator, and permitting the rectifier on the off-side to serve as the switch. With this feature, the circuit is simplified, and the voltage loss caused by the forward voltage across the diode for preventing a reverse current can be reduced, thereby improving the charging efficiency. Further, the rectifying portion can include a rectifier diode and a bypass switch that bypasses the rectifier diode, the bypass switch being activated when a forward current flows through the rectifier diode. With this feature, the voltage loss caused by the forward voltage across the rectifier diode can also be reduced.

In a clocking device having a clocking portion capable of operating by electric power supplied from the charging portion, the controller can perform the chopper control by acquiring part of the oscillation signal used for clocking in the clocking portion from an oscillation circuit or a frequency-dividing circuit. In this manner, the power-generating device of the present invention can produce electric power by catching the user's motion or the like efficiently, and accumulate the electric power in the charging portion. By utilizing the charged energy in the charging portion, therefore, it is possible to stably operate, not only a clocking portion with digital representation, but also a clocking portion with analog representation that includes a clocking circuit for outputting motor-driving pulses and a hand-rotating motor for rotating clock hand by the motor-driving pulses. As a result, a highly reliable clocking device can be provided that includes a power-generating device built therein that can prevent the clocking device from operating unreliably or stopping altogether when the kinetic energy generated by a user's motion is small, and that can improve operating performance in a user-carrying condition.

In view of the above, an object of the present invention is to provide a power-generating device that can charge electricity in a charging portion even when an electromotive voltage generated in a dynamo coil is less than a charged voltage of the charging portion.

Another object of the present invention is to provide a power-generating device that contains a means for catching kinetic energy, such as a rotating weight, that can efficiently convert kinetic energy into electrical energy without causing overshoot unnecessary charging brake, even when the device is under a continuous motion.

Still another object is to provide a power-generating device and a charging method that enable optimal charging based on the relationship between the electromotive voltage and the charged voltage.

Yet still another object is to provide a power-generating device that can minimize a loss produced by the forward voltage across a diode for rectifying an alternating current.

A further object of the present invention is to employ, in a clocking device, a power-generating device having a high charging ability according to the present invention, and to provide a clocking device that does not require a battery, is small in size, and has high reliability.

Still other objects and advantages of the invention will in part be obvious and will in part be apparent from the specification.

The invention accordingly comprises the several steps and the relation of one or more of such steps with respect to each of the others thereof, which will be exemplified in the method hereinafter disclosed, and the scope of the invention will be indicated in the claims.

BRIEF DESCRIPTION OF THE DRAWINGS

For a fuller understanding of the invention, reference is made to the following description taken in connection with the accompanying drawings in which.

DESCRIPTION OF THE PREFERRED EMBODIMENTS

Figure 1:
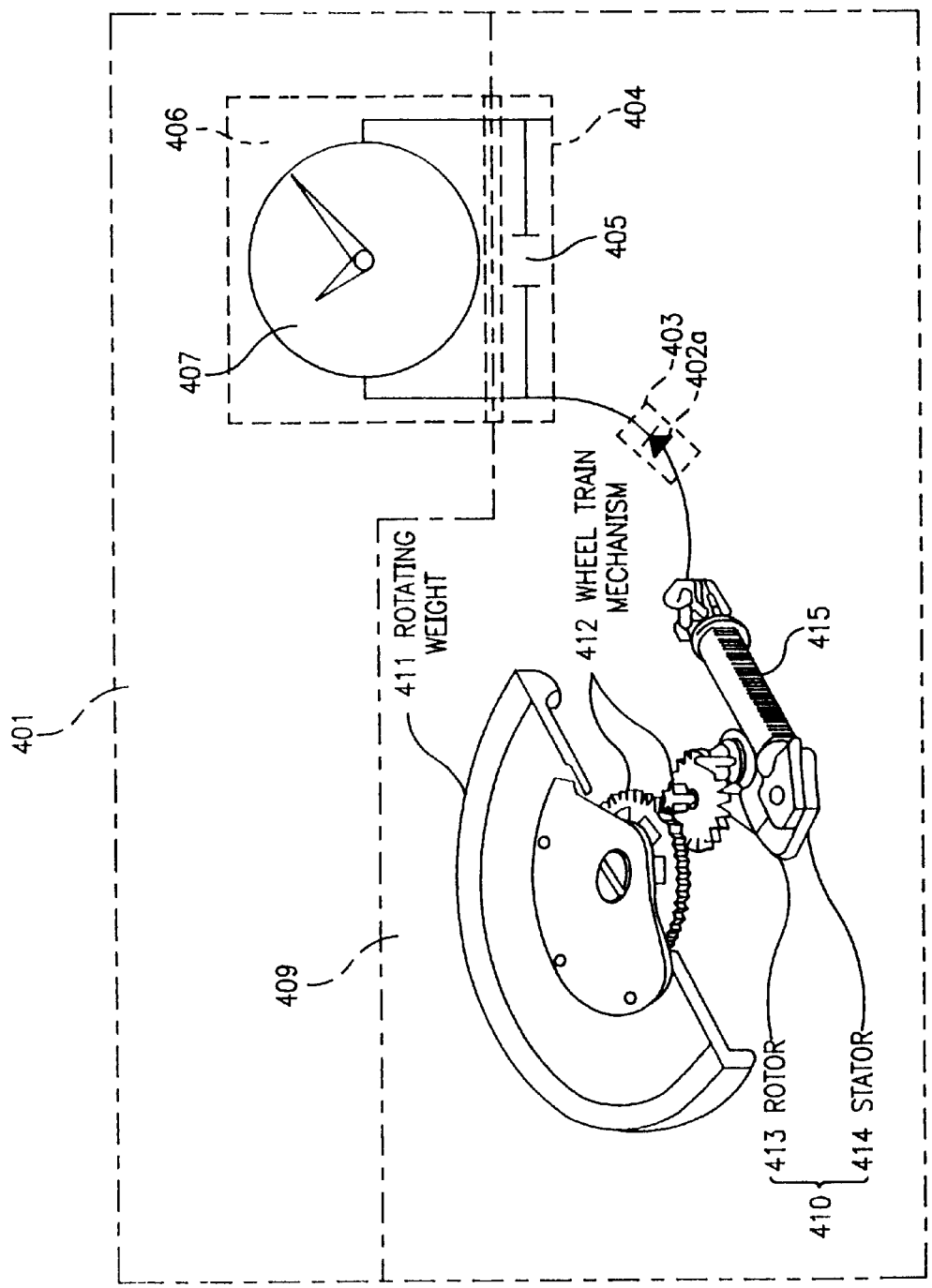
FIG. 1 is a schematic representation of a clocking device constructed in accordance with the prior art.
Figure 2A:
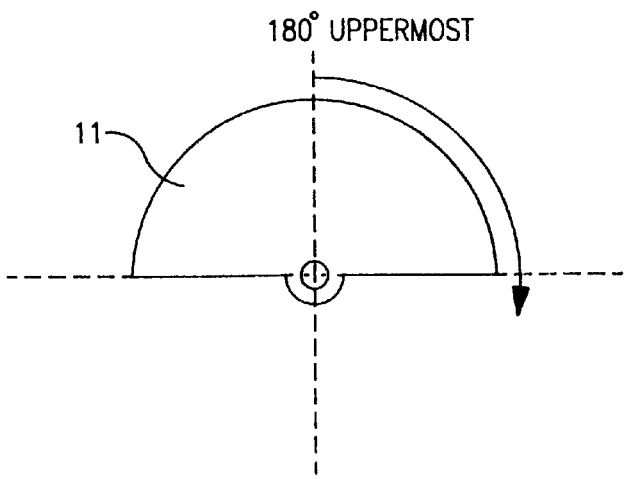
FIGS. 2(a)–2(c) are schematic representations depicting the operation of a rotating weight constructed in accordance with the prior art.
Figure 2B:
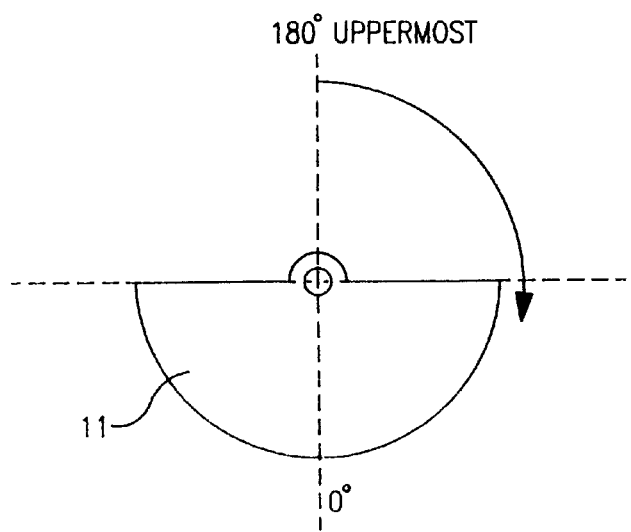
Figure 2C:
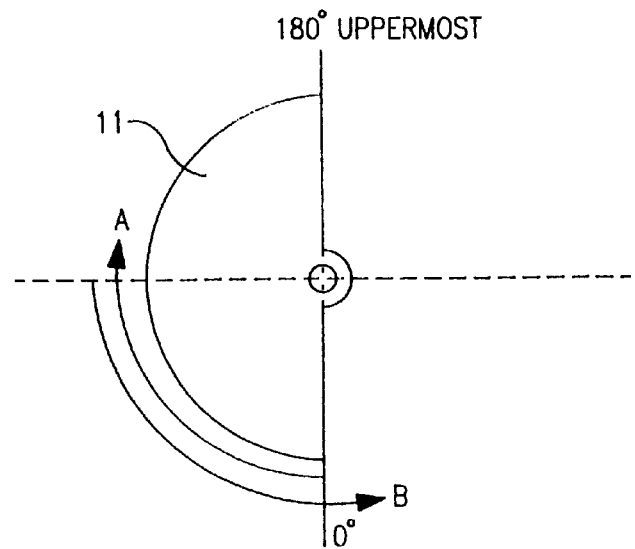
Figure 3:
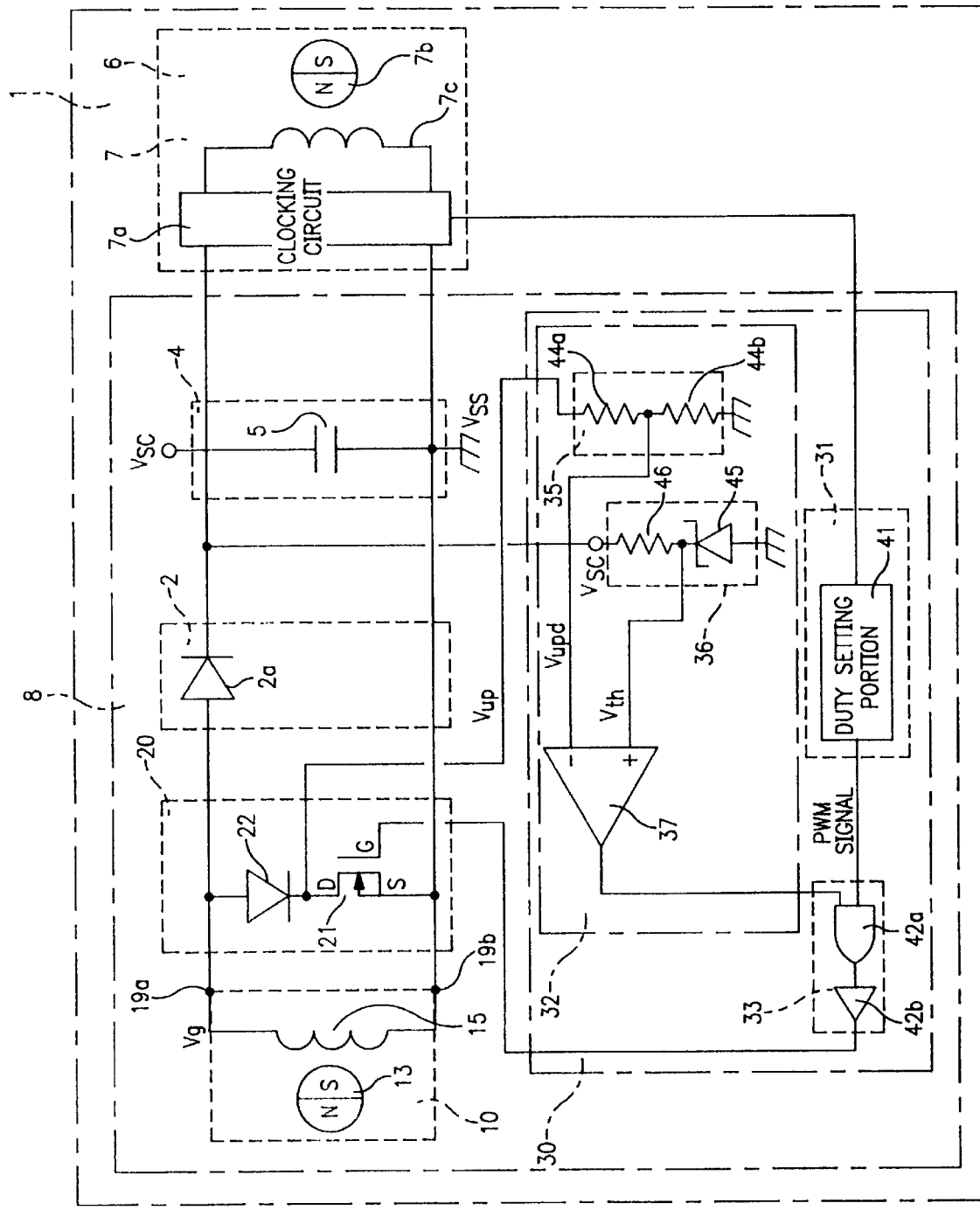
FIG. 3 is a block diagram depicting a clocking device with a power-generating device constructed in accordance with a first embodiment of the present invention.

Referring to FIG. 3, a block diagram depicting an improved clocking device constructed in accordance with a first embodiment of the invention is generally illustrated as clocking device 1. Clocking device 1 includes a power-generating device 8 and a functioning unit 6 capable of operating by electric power supplied from the power-generating device 8. Functioning unit 6 may be a timepiece 7, capable of indicating time in analog representation, and may include a motor having a rotor 7b and a stator 7c. Power-generating device 8 includes a dynamo 10 for generating an alternating current power by utilizing kinetic energy of a rotating weight 11 (as explained above in connection with FIG. 1) and a switch 20 for short-circuiting between output terminals 19a and 19b connected to a dynamo coil 15 of dynamo 10. Power-generating device 8 also includes a controller 30 for controlling switch 20, a charging portion 4 for accumulating electronic power produced by dynamo 10, and a rectifying portion 2 for rectifying the alternating current output of dynamo 10 and outputting it to charging portion 4. Electric power produced in the form of an electromotive voltage $V_g$ by dynamo 10 is subject to half-wave rectification by a rectifier diode 2a of rectifying portion 2, and then charged in charging portion 4. Charging portion 4 includes a large-capacity capacitor 5, which is charged to have a charged voltage $V_{sc}$, which is used to power timepiece 7.

Switch 20 of power-generating device 8 includes an n-channel MOSFET 21 that serves to short-circuit output terminals 19a and 19b of dynamo 10, and a diode 22, which is connected in series to MOSFET 21, and is arranged in a direction to block a current from flowing in the direction opposite to rectifying portion 2.

Figure 6:
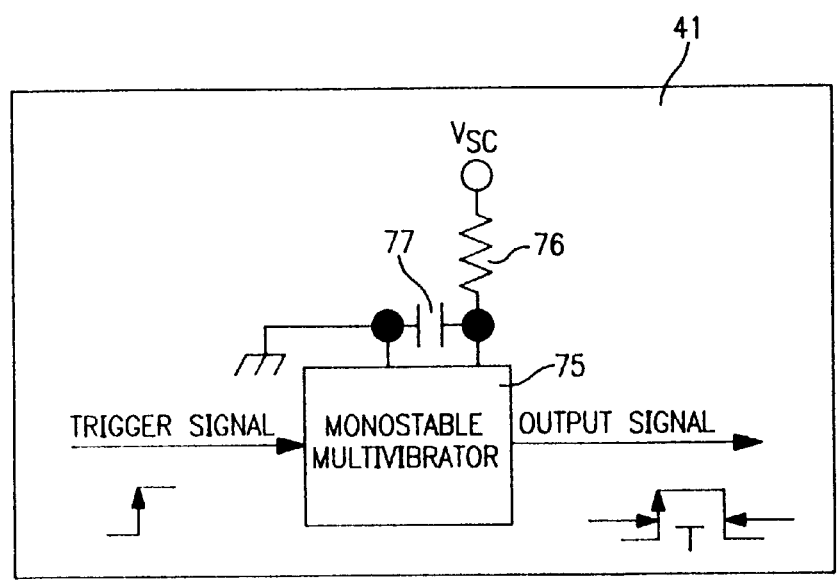
FIG. 6 is a diagram showing a duty setting portion of a power-generating device constructed in accordance with the present invention.

Controller 30 of power-generating device 8 functions to control switch 20, and includes a chopper controller 31 for outputting to n-channel MOSFET 21 a Pulse Width Modulation ("PWM") signal, which is cyclically activated and deactivated, a determiner 32 for determining whether charging portion 4 should be charged with the electromotive voltage $V_g$ of dynamo 10, and a supply portion 33 for supplying the PWM signal to gate G of n-channel MOSFET 21 based on the determination of determiner 32. Chopper controller 31 includes a duty setting portion 41 capable of receiving an oscillation signal from a clocking circuit 7a of clocking portion 7, and outputting a PWM signal of an appropriate duty. Duty setting portion 41 employs, as a trigger, an oscillation output received from a frequency-dividing circuit of clocking circuit 7a and outputs the PWM signal having a desired duty ratio. By way of example, as shown in FIG. 6, duty setting portion 41 may comprise a monostable multivibrator 75, a resistor 76 and a capacitor 77. Referring to FIGS. 3 and 6, upon receiving a trigger pulse, duty setting portion 41 outputs a pulse having a certain time width. A width T of the output pulse is determined by the time constant of resistor 76 and capacitor 77. Accordingly, duty setting portion 41 can optionally set the output pulse width T with respect to a one-cycle time width of the oscillation signal received from, for example, the frequency-dividing circuit of clocking circuit 7a, and provide the PWM signal of any desired duty ratio.

When the PWM signal is supplied through supply portion 33 to gate G of n-channel MOSFET 21 of switch 20 based on the determination of determiner 32, the connection between output terminals 19a and 19b of dynamo 10 is cyclically connected and disconnected. Therefore, during the period when terminals 19a and 19b are short-circuited, electrical energy generated by dynamo 10 is stored in the inductance of dynamo coil 15, which, in turn also serves as a reactor of a boosting chopper circuit. As a result, spike-like electric power with a voltage higher than a typical electromotive voltage $V_g$ can be obtained from output terminals 19a and 19b. To control the output of the PWM signal, supply portion 33 includes an AND circuit 42a and an inverter 42b for amplifying the PWM signal. Inverter 42b functions as a drive means for amplifying a level of the PWM signal to a level sufficient to operate switch 20. If the level of the PWM signal output from AND gate 42a is sufficient to operate switch 20, inverter 42b may be eliminated.

As shown in FIG. 3, determiner 32 determines whether charging portion 4 should be charged with electromotive voltage $V_g$ by first using a sampler 35 to sample a sample voltage $V_{up}$ given as normal electromotive voltage $V_g$ of dynamo 10. Then, a reference voltage generator 36 generates a reference voltage $V_{th}$ to be compared with the sampled voltage $V_{up}$. Both the sampled voltage $V_{up}$ and the reference voltage $V_{th}$ are compared by a comparator 37. To determine whether charging portion 4 should be charged, both the output signal of comparator 37 and the PWM signal are then applied to AND gate 42a of supply portion 33. When it is determined that electromotive voltage sampled as voltage $V_{up}$ is higher than charged voltage $V_{sc}$, AND gate 42a prevents the PWM signal from being outputted, and the electromotive voltage can be charged to charge portion 4 without being subject to chopper amplification.

Sampler 35 of this embodiment samples voltage $V_{up}$ at the higher potential side (drain side) of n-channel MOSFET 21 of switch 20. Voltage $V_{up}$ is divided by resistors 44a and 44b, to produce a divided voltage $V_{upd}$, which is applied to an inverted input of comparator 37. Reference voltage generator 36 includes a Zener diode 45 for generating reference voltage $V_{th}$ as a breakdown threshold voltage, and a resistor 46 connected in series to Zener diode 45 for limiting a Zener current when Zener diode 45 is electrically conducted. Resistor 46 also functions to pull up reference voltage $V_{th}$ to charged voltage $V_{sc}$ until charged voltage $V_{sc}$ reaches the threshold voltage of Zener diode 45.

The Zener voltage is set at a value such that, if charged voltage $V_{sc}$ was equal to the Zener voltage value, charged voltage $V_{sc}$ would require a boosting operation. The threshold voltage is preferably set at a voltage value frequently used in a normal condition based on a charging characteristic of charging portion 4. For example, the Zener voltage may be set at the rated voltage of functioning portion 6, less the charging characteristic of charging portion 4. Given that a working voltage is designated $V_{sc1}$, a maximum output voltage $V_{upm}$ of chopper-boosted voltage $V_{up}$ sampled by switch 20 is determined by the following formula:

$$V_{upm} = V_{sc1} + V_{f(2a)} + k \quad (1)$$

where Vf(2a) is a forward voltage drop across rectifier diode 2a and k is a portion of the voltage used to boost electromotive voltage $V_g$ for charging.

Boosted output voltage $V_{up}$ is divided by sampler 35 depending on the ratio of resistance 44a to resistance 44b defined as $R_A/R_B$. The relationship between output voltage $V_{th}$ and boosted output voltage $V_{up}$ is given by the following relationship:

$$R_A/R_B = (V_{up}/V_{th}) - 1 \quad (2)$$

$$V_{up} \times (R_B/(R_A + R_B)) = V_{upd} \quad (3)$$

Thus, the voltage dividing ratio of sampler 35 represented by formula (2) is set so that when boosted output voltage $V_{up}$ reaches $V_{upm}$ represented by formula (1), output voltage $V_{th}$ of reference voltage generator 36 is equal to divided output voltage $V_{upd}$ of sampler 35 as indicated by formula (3).

More specifically, assuming that charged voltage $V_{sc}$ is 1.3 V, forward voltage drop Vf(2a) across rectifier diode 2 is 0.2 V, k is 0.1 V, and reference voltage $V_{th}$ of Zener diode 45 is 0.8 V, then maximum output voltage $V_{upm}$ of the boosted output voltage is given by 1.3+0.2+0.1=1.6 V. Substituting the 0.8 V value for $V_{up}$ in formula (3), the voltage dividing ratio of sampler 35, defined as $R_A/R_B$, is equal to 1. Therefore, when boosted output voltage $V_{up}$ reaches maximum output voltage $V_{upm}$ (1.6 V), voltage $V_{upd}$ output from sampler 35 becomes 0.8 V, i.e., the same potential as reference voltage $V_{th}$=0.8 V output from reference voltage generator 36. Accordingly, in this example, when boosted output voltage $V_{up}$ exceeds 1.6 V, the output of comparator 37 is inverted to turn off AND gate 42a of supply portion 33, stopping the PWM signal from being supplied to switch 20.

Thus, in controller 30 of this embodiment, when divided output voltage $V_{upd}$ of boosted voltage $V_{up}$ equals reference voltage $V_{th}$, it is adjudged that electromotive voltage $V_g$ of dynamo 10 is of sufficiently large value to permit direct charging with respect to working voltage $V_{sc1}$ of charging portion 4. In that case, where a large input motion provides a large electromotive voltage $V_g$, the output of dynamo 10 is directly supplied to charging portion 4 through rectifying portion 2 without being subject to chopper boosting. On the other hand, when divided output voltage $V_{upd}$ does not equal or exceed reference voltage $V_{th}$, it is adjudged that electromotive voltage $V_g$ of dynamo 10 is not of sufficiently large value to permit direct charging to capacitor portion 4. Therefore, the input motion is deemed a small motion, and output voltage $V_{up}$ is boosted under chopper control prior to being supplied to charging portion 4.

To summarize the operation of comparator 37, comparator 37 compares voltage $V_{upd}$, which results from dividing boosted output voltage $V_{up}$ by sampler 35, with reference voltage $V_{th}$ of reference voltage generator 36. When divided output voltage $V_{upd}$ has a higher potential than reference voltage $V_{th}$ ($V_{upd}$>$V_{th}$), comparator 37 deems the input motion a large motion and outputs a low-level signal to AND gate 42a, whereupon supply portion 33 is closed and no PWM signal is supplied to switch 20. On the other hand, when divided output voltage $V_{upd}$ has a lower potential than reference voltage $V_{th}$ ($V_{upd}$<$V_{th}$), comparator 37 deems the input motion a small motion and outputs a high-level signal to AND gate 42a, whereupon supply portion 33 is opened and the PWM signal is supplied to switch 20 for chopper amplification.

Further, in determiner 32, where charged voltage $V_{sc}$ of charging portion 4 is lower than reference voltage $V_{th}$, and charging portion 4 has a low charge of electricity, Zener diode 45 is not electrically conducted, and, hence, reference voltage $V_{th}$ is the same potential as charged voltage $V_{sc}$ of charging portion 4. Accordingly, when charged voltage $V_{sc}$ of charging portion 4 is low, even a low electromotive voltage $V_g$ generated in dynamo coil 15 may exceed charged voltage $V_{sc}$, and as such may be charged in charging portion 4 without chopper amplification.

Under such a condition, reference voltage generator 36 of this embodiment lowers reference voltage $V_{th}$ to correspond to charged voltage $V_{sc}$. Therefore, even when boosted voltage $V_{up}$ does not reach the value of charged voltage $V_{sc}$, comparator 37 judges electromotive voltage $V_g$ of dynamo 10 to be sufficiently high (i.e., deems input motion a large motion), and stops the supply of the PWM signal to switch 20. Thus, controller 30 reduces the energy necessary for driving switch 20 by eliminating chopper control when the electromotive voltage $V_g$ is of a value that permits it to be charged in charging portion 4 without chopper amplification. Consequently, the efficiency of power generation is improved.

A further improvement in the efficiency of power generation is achieved by rectifying portion 2, which carries out half-wave rectification to electromotive voltage $V_g$. Controller 30 supplies the PWM signal to switch 20 to short-circuit MOSFET 21 even when electromotive voltage $V_g$ is generated with a polarity opposite to the rectified direction. However, since diode 22 is connected in series to n-channel MOSFET 21, output terminals 19a and 19b are not short-circuited when electromotive voltage $V_g$ of dynamo 10 is produced with a polarity opposite to the rectified direction. This arrangement avoids a current flow where charging is not enabled that has the effect of braking the motion of rotor 13, i.e., the motion of rotating weight 11. Further, if output terminals 19a and 19b are short-circuited when electromotive voltage $V_g$ of dynamo 10 is produced with an opposite polarity, the electrical energy generated is consumed in the form of heat produced by the winding resistance of dynamo coil 15, and does not contribute to charging charging portion 4. In this embodiment, therefore, diode 22 for preventing electrical conduction in the reversed direction is disposed to avoid useless consumption of electrical energy caused by switching MOSFET 21 and to prevent a decrease of power generation efficiency.

Figure 4:
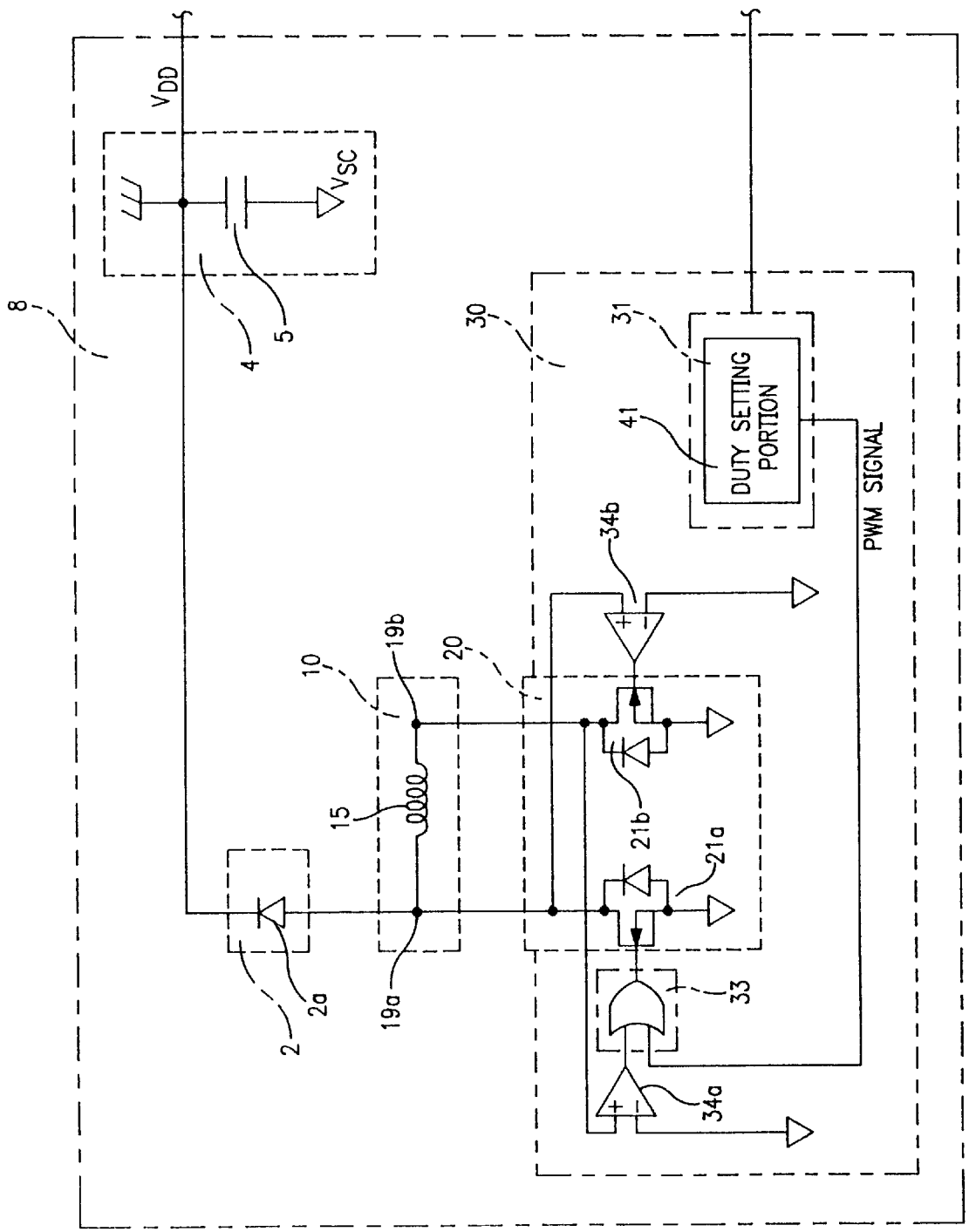
FIG. 4 is a block diagram depicting a second embodiment of a power-generating device constructed in accordance the present invention.

Alternatively, as shown in FIG. 4, the reverse current can be prevented by providing a pair of polarity-determining portions 34a and 34b, provided within controller 30, each of which includes a comparator. Polarity-determining portions 34a and 34b function to determine the polarity of electromotive voltage $V_g$ of dynamo 10. When electromotive voltage $V_g$ is produced with an opposite polarity to that rectified by rectifying portion 2, polarity-determining portions 34a and 34b set in an open position an n-channel MOSFET 21b of switch 20 connected to output terminal 19b opposite to rectifying portion 2. This modification permits the elimination of diode 22, which prevented electrical conduction in the reversed direction. Incidentally, FIG. 4 depicts, by way of example, power-generating device 8 with a higher potential $V_{dd}$ grounded.

Figure 5:
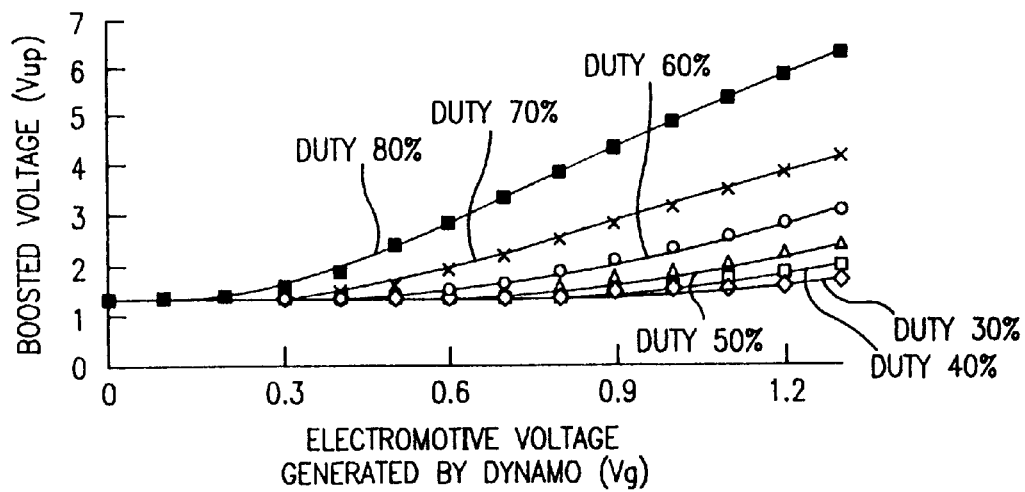
FIG. 5 is a graph showing calculated results of a voltage boosted by chopper amplification of a power-generating device constructed in accordance with the present invention.

Referring to FIG. 5, boosted voltage $V_{up}$ boosted by chopper amplification is plotted against electromotive voltage $V_g$. As explained above, chopper control effectively recognizes that, when switch 20 is electrically conducted, electromotive voltage $V_g$ generated in dynamo coil 15 can be accumulated as energy in the inductance of dynamo coil 15, and when switch 20 is not electrically conducted, the energy accumulated in the inductance of dynamo coil 15 can be superposed on electromotive voltage $V_g$ to thereby obtain boosted voltage $V_{up}$. If boosted voltage $V_{up}$ is sufficiently greater than charged voltage $V_{sc}$ of charging portion 4, charging portion 4 can be charged even if electromotive voltage $V_g$ is lower than charged voltage $V_{sc}$.

FIG. 5 also shows calculated results of boosted voltage $V_{up}$ with respect to electromotive voltage $V_g$ when a duty ratio is varied, where the duty ratio represents a proportion of the period during which switch 20 is electrically conducted relative to one cycle of oscillation frequency of the PWM signal used to activate and deactivate switch 20. The calculations charted in FIG. 5 were made where charged voltage $V_{sc}$ of charging portion 4 was set to 1.3 V. As is demonstrated in FIG. 5, where the PWM signal has a higher duty ratio, electromotive voltage $V_g$ generated in dynamo coil 15 can be boosted significantly from a smaller value. In chopper controller 31 of this embodiment, the duty ratio is set to an optimum value by duty setting portion 41.

Figure 7A:
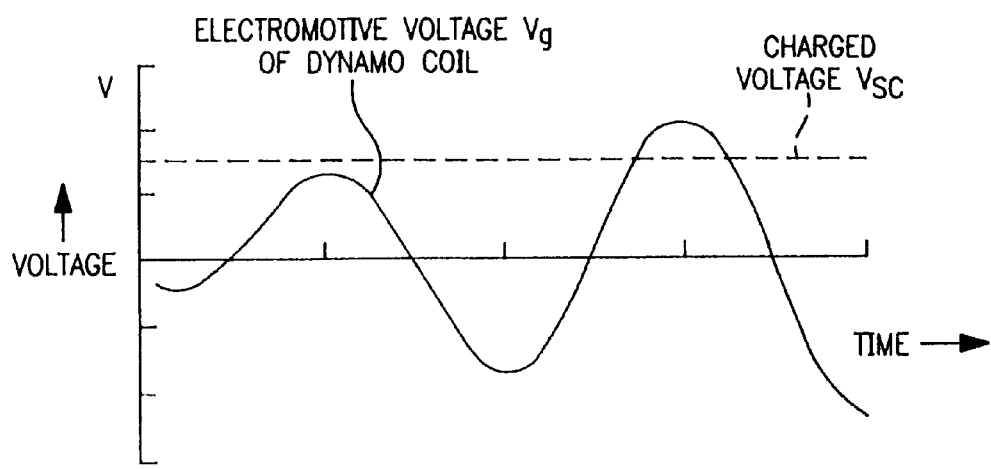
FIGS. 7(a) and 7(b) are charts showing waveforms of a voltage and current, respectively, produced by the circuit depicted in FIG. 3 in the absence of chopper amplification.
Figure 7B:
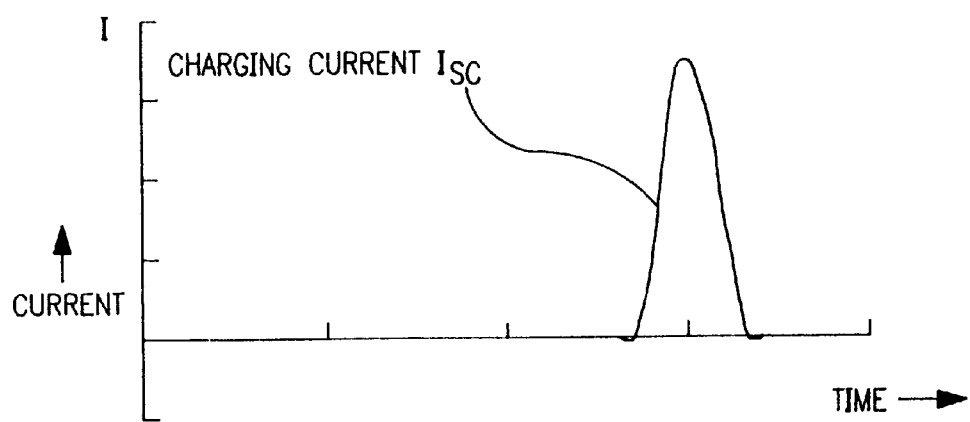

Referring to FIG. 7(a), electromotive voltage $V_g$ of dynamo coil 15 produced by power-generating device 8 of FIG. 3 is shown when chopper control is not effectuated (i.e., when switch 20 is maintained in an open position). FIG. 7(b) shows the charging current $I_{sc}$ charged in charging portion 4 under the same condition after half-wave rectification by rectifying portion 2. As shown in FIGS. 7(a) and 7(b), in the absence of chopper amplification, charging current $I_{sc}$ is generated only when electromotive voltage $V_g$ of dynamo coil 15 exceeds charged voltage $V_{sc}$ of charging portion 4 (not taking into account forward voltage $V_f$ across diode 2a). It is thus understood that, when electromotive voltage $V_g$ generated in dynamo coil 15 is smaller than charged voltage $V_{sc}$, the kinetic energy used for rotating dynamo 10 is wasted.

Figure 8A:
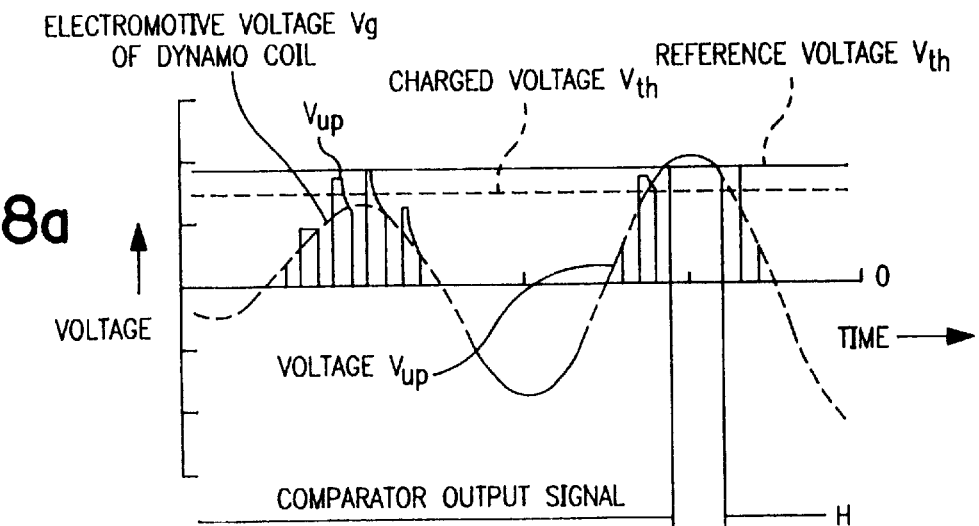
FIGS. 8(a)–8(c) are charts showing waveforms of voltages, PWM and drive signals, and currents produced by chopper amplification of a power-generating device constructed in accordance with a first embodiment of the invention.

In contrast to FIG. 7(a), FIG. 8(a) depicts waveforms of voltages produced by power-generating device 8 when electromotive voltage $V_g$ is charged under chopper control. In FIG. 8(a), solid lines indicate boosted or output voltage $V_{up}$ amplified under chopper control when electromotive voltage $V_g$ (indicated by broken lines) of dynamo coil 15 (similar to that shown in FIG. 7(a)) is obtained. In power-generating device 8 of this embodiment, the PWM signal, shown in FIG. 8(b), supplied from chopper controller 31 of controller 30 is output as a drive signal for n-channel MOSFET 21 through supply portion 33. The output of dynamo 10 is chopped by the drive signal into single pulses, thereby providing output voltage $V_{up}$ boosted by chopper amplification.

Figure 8B:
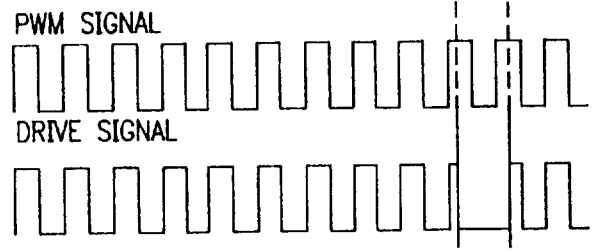

Further, as shown in FIGS. 8(a) and 8(b), by setting reference voltage $V_{th}$ to a value greater than charged voltage $V_{sc}$ of charging portion 4, when boosted voltage $V_{up}$ reaches reference voltage $V_{th}$, the output signal of comparator 37 is inverted, and supply portion 33 is closed to stop the PWM signal from being output as a drive signal. During the period in which the output signal of comparator 37 is inverted, therefore, switch 20 does not perform chopper amplification, and electric power produced by electromotive voltage $V_g$ of dynamo 10 is output to charging portion 4.

Figure 8C:
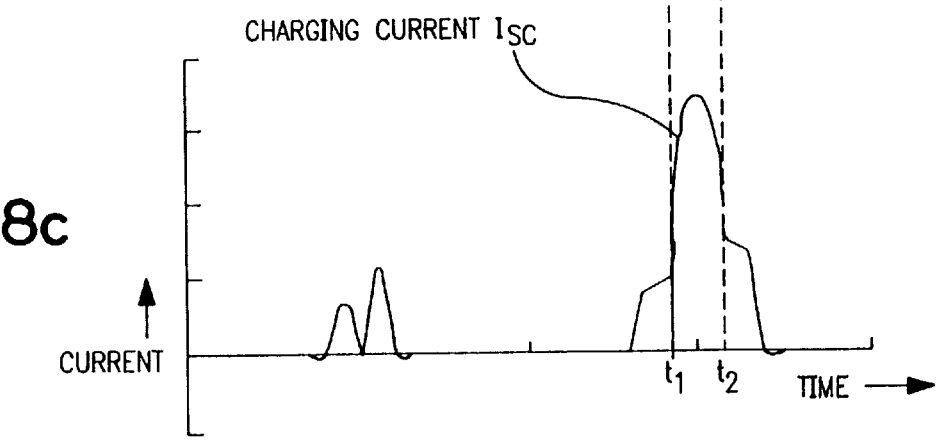

Referring to FIG. 8(c), charging current $I_{sc}$ charged in charging portion 4 after being subject to chopper control and half-wave rectification in rectifying portion 2 is graphed as a function of time. Because the voltage provided from dynamo 10 output terminals 19a and 19b is boosted to boosted voltage $V_{up}$ by chopper control, boosted voltage $V_{up}$ may exceed charged voltage $V_{sc}$ during some period even if electromotive voltage $V_g$ does not reach charged voltage $V_{sc}$, causing charging current $I_{sc}$ to flow during such a period. Comparing charging current $I_{sc}$, shown in FIG. 7(b), produced without chopper control, with charging current $I_{sc}$ shown in FIG. 8(c), produced with booster control, demonstrates that chopper amplification dramatically increases charging current $I_{sc}$. Further, during a period from a time t1 to a time t2, a sufficiently high electromotive voltage $V_g$ is deemed to be generated because boosted output voltage $V_{up}$ reaches reference voltage $V_{th}$. During that period, charging current $I_{sc}$ flows without the boosting provided by chopper amplification. Accordingly, chopper control is stopped during this period to save electric power consumed by power-generating device 8 through the operation of switch 20, thereby improving the efficiency with which charging portion 4 is charged.

To explain in more detail the voltage waveforms produced by chopper control, as switch 20 is or is not electrically conducted in accordance with a high- or low-level output signal given as the PWM signal, electromotive voltage $V_g$ almost has a 0 value because, when the PWM signal is at a high level, switch 20 is electrically conducted, and a short-circuit current flows through dynamo coil 15 to permit energy to be accumulated in the inductance of dynamo coil 15. Then, because switch 20 is not electrically conducted when the PWM signal is at a low level, electromotive voltage $V_g$ is output as boosted voltage $V_{up}$ produced from superposing the energy accumulated in the inductance of dynamo coil 15 on electromotive voltage $V_g$. Further, when electromotive voltage $V_g$ becomes a higher level than charged voltage $V_{sc}$, the signal of determiner 32 is output at a low level (i.e., the input motion of the rotating weight is deemed to be large), switch 20 is not electrically conducted, and charging portion 4 is charged directly with electromotive voltage $V_g$. In this case, boosted voltage $V_{up}$ is the same potential as electromotive voltage $V_g$ generated in dynamo coil 15. Thus, the charging operation of charging portion 4 is carried out such that when electromotive voltage $V_g$ is smaller than charged voltage $V_{sc}$, the charging current flows with the aid of the boosting chopper operation, and when electromotive voltage $V_g$ is larger than charged voltage $V_{sc}$, the boosting chopper operation is ceased, and the charging current flows through the normal half-wave rectifier circuit.

By performing chopper amplification, as is shown by comparing FIG. 7(b) and FIG. 8(c), it is possible to achieve charging by using the output power of dynamo 10, i.e., electromotive voltage $V_g$, in cases where it has not been done in the prior art. Further, by employing the claimed invention, a larger part of the kinetic energy of the rotating weight, which drives the rotor, is converted into electrical energy for charging. As a result, the efficiency of power generation and the charging efficiency is improved. At the same time, by performing chopper control, since the short-circuit current flowing through dynamo coil 15 applies a brake to the motion of the rotating weight at an appropriate time, the incidence of overshoot is reduced. Thus, rotating weight 11 is better able to follow a continuous motion of the wrist or the like, and more efficiently captures kinetic energy. In addition, chopper control improves not only the charging efficiency, but also the efficiency of acquiring kinetic energy from the environment of power-generating device 8 or clocking device 1. Consequently, power-generating device 8 and clocking device 1 provide a self-contained means of generating enough power to operate without a battery.

Figure 9:
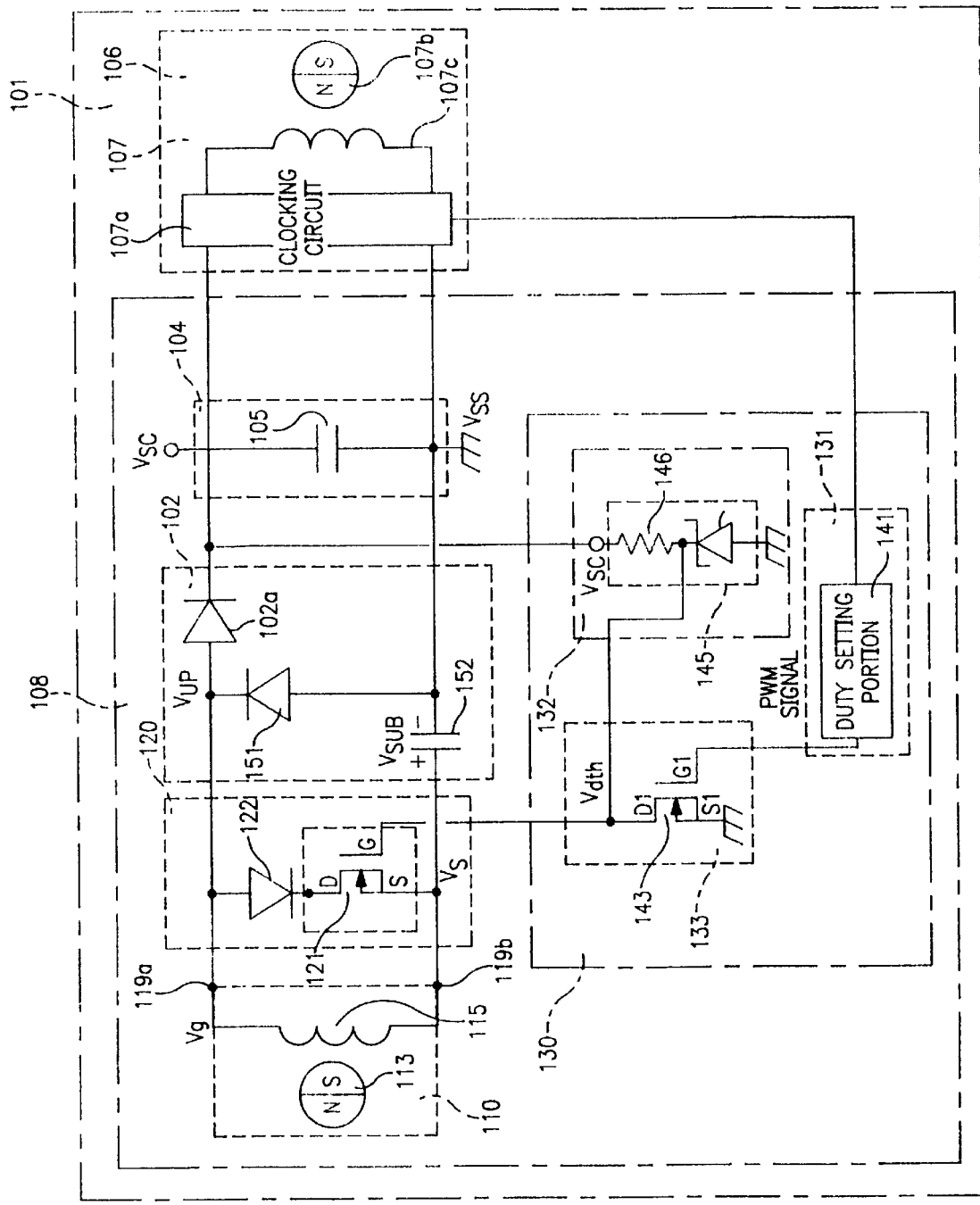
FIG. 9 is a block diagram depicting a clocking device constructed in accordance with a second embodiment of the present invention.

FIG. 9 shows a clocking device constructed in accordance with a second embodiment of the present invention. Components common to those in the first embodiment are denoted by similar reference numerals. A clocking device 101 of this embodiment includes a power-generating device 108 and a functioning unit 106, which may be, for example, a timepiece 107, capable of operating by electric power supplied from power-generating device 108. Power-generating device 108 is constructed similarly to power-generating device 8 explained above. Power-generating device 108 includes a dynamo 110, a switch 120, capable of short-circuiting between both terminals 119a and 119b of a dynamo coil 115 of dynamo 110, a controller 130 for controlling switch 120, a rectifying portion 102, and a charging portion 104.

As is shown in FIG. 9, in addition to having a diode 102a for half-wave rectification, rectifying portion 102 includes a diode 151 for voltage doubling rectification and a capacitor 152 for voltage doubling. In the event that electromotive voltage $V_g$ generated in dynamo 110 has the same potential polarity as the ground ($V_{ss}$) side, voltage doubling diode 151 is electrically conducted to charge voltage doubling capacitor 152 with electromotive voltage $V_g$. Alternatively, where electromotive voltage $V_g$ has the same polarity as the higher potential ($V_{sc}$) side, the voltage charged in voltage doubling capacitor 152 is added to electromotive voltage $V_g$ and the resulting sum is output to charging portion 104. In other words, assuming that the voltage charged in voltage doubling capacitor 152 is $V_{sub}$, at a time when electromotive voltage $V_g$ has the same polarity as the higher potential side, the combined potential of charged voltage $V_{sub}$ previously charged in voltage doubling capacitor 152 and electromotive voltage $V_g$ cause rectifier diode 102a to electrically conduct to charge electricity in a large-capacity capacitor 105 in charging portion 104. Prior to matching the polarity and voltage of $V_g$ to the higher matching potential side, doubling diode 151 is back-biased and prevented from electrically conducting because it is applied with voltage directing from the cathode side to the anode side due to the polarity of electromotive voltage $V_g$ and charged voltage $V_{sub}$. Thus, rectifying portion 102 of this embodiment serves as a voltage doubling rectifier circuit that can provide an output voltage twice the potential of electromotive voltage $V_g$ by combining two electromotive voltages $V_g$, which are alternately output with different polarities.

Further, power-generating device 108 of this embodiment includes switch 120, which is constructed similarly to switch 20 in the previously described embodiment. Switch 120 can chopper-amplify electromotive voltage $V_g$ having the same polarity as the higher potential side under the chopper control. Thus, electromotive voltage $V_g$ having the same potential polarity as the higher potential side can be used to boost voltage $V_{up}$ and then can be supplied to rectifying portion 102. When electromotive voltage $V_g$ has a polarity opposite to the higher potential side, chopper amplification is not performed because an n-channel MOSFET 121 provided in switch 120 prevents electrical conduction in the direction reverse to that provided in switch 120, causing voltage doubling capacitor 152 to be charged with electromotive voltage $V_g$. Since voltage doubling capacitor 52 is discharged upon each cycle, charged voltage $V_{sub}$ will never become greater than electromotive voltage $V_g$ and voltage doubling capacitor 152 can be charged with electromotive voltage $V_g$ without chopper amplification.

As with the above embodiment, controller 130 includes a chopper controller 131 a duty setting portion 141, capable of outputting a PWM signal by use of an oscillation signal output from a clocking circuit 107a. The PWM signal is supplied via a supply portion 133 operated in response to a signal from a determiner 132 to a gate G of a MOSFET 121 for chopper control. Determiner 132 of this embodiment employs the same circuit as the above-described reference voltage generator 132 and outputs a reference voltage $V_{dth}$ based on the Zener voltage of a Zener diode 145. Supply portion 133 includes an n-channel MOSFET 143 having a drain D1, to which reference voltage $V_{dth}$ is applied. N-channel MOSFET 143 has a source S1 connected to ground and a gate G1 of n-channel MOSFET 143, to which the PWM signal from duty setting portion 141 is supplied. Drain D1 is connected to reference voltage generator 132 and to gate G of MOSFET 143. When the PWM supplies a high-level signal to gate G1, drain S1 and source D1 of MOSFET 143 are electrically conducted to each other, causing gate G of MOSFET 121 in switch 120 to receive a low-level signal. On the other hand, when the PWM supplies a low-level signal to gate G1, MOSFET 143 in supply portion 133 is not electrically conducted, whereupon reference voltage $V_{dth}$ is applied to gate G of MOSFET 121.

N-channel MOSFET 121 in switch 120 acts as a voltage-driven switching element such that a resistance value between drain D and source S is changed from infinite Ω to several mΩ depending on the voltage applied between gate G and source S. Specifically, the resistance value decreases in proportion to the voltage applied between gate G and source S. When MOSFET 121 is activated, the voltage applied between gate G and source S is required to be set at a value that enables sufficient amount of current to flow to drain G. A threshold voltage $V_{gsth}$ between gate G and source S represents the voltage between gate G and source S at which a drain current is not larger than a certain prescribed current value. Further, in an alternative embodiment, a capacitor (not shown) having an input capacity $C_{iss}$ may be disposed between gate G and source S of MOSFET 121. By charging electricity in the input capacity $C_{iss}$ to provide a voltage value not lower than threshold voltage $V_{gsth}$, drain D and source S of MOSFET 121 can be induced to electrically conduct to each other.

In power-generating device 108 of this embodiment, because a voltage doubling rectifier circuit is used in rectifying portion 102, a voltage $V_s$ at source S of MOSFET 121 is defined as charged voltage $V_{sub}$ of voltage doubling capacitor 152. Charged voltage $V_{sub}$ of voltage doubling capacitor 152 has a value that depends upon electromotive $V_g$ of dynamo 110, which in turn depends on the magnitude of an input motion that acts on a rotating weight 111 of dynamo 110. Specifically, when a large input motion is applied to rotating weight 111, charged voltage Vsub is provided as a charged voltage, having a large value corresponding to electromotive voltage $V_g$ generated by dynamo coil 115, and has the same polarity as the lower potential side. Conversely, when the input motion is small, charged voltage $V_{sub}$ provides a small charged value. Further, because the low potential side of charging portion 104 is grounded, it creates the condition that source voltage $V_s$ of MOSFET 121 acts as an offset potential corresponding to charged voltage $V_{sub}$ of voltage doubling capacitor 152.

Accordingly, charged voltage $V_{sub}$ may be used to determine whether switch 120 performs chopper amplification. The charging value capacity of Ciss of n-channel MOSFET 121 is set to accept a voltage not less than $V_{gsth}$ by setting reference voltage $V_{dth}$ as follows:

$$V_{dth} > V_{sub} + V_{gsth} \tag{4}$$

As is evident from equation (4), to make drain D and source S of n-channel MOSFET 121 electrically conducted to each other, the potential difference between reference voltage $V_{dth}$ applied from driving MOSFET 143 and charged voltage $V_{sub}$ of voltage doubling capacitor 152 is required to have a larger value than the value of threshold voltage $V_{gsth}$. In other words, since threshold $V_{gsth}$ and setting value $V_{dth}$ are fixed, switch 120 performs chopper control when charged voltage $V_{sub}$ meets the following condition:

$$V_{sub} < V_{dth} - V_{gsth} \tag{5}$$

Because the potential of charged voltage $V_{sub}$ of voltage doubling capacitor 152 varies to a large extent based on the input motion of rotating weight 111, equation (5) cannot be satisfied if the value of $V_{sub}$ is increased relative to the preset value of reference voltage $V_{dth}$. If that is the case, MOSFET 121 is not activated even though the PWM signal is supplied to gate G. Accordingly, chopper control is not carried out and electric power generated as electromotive voltage $V_g$ is supplied to rectifying portion 102. Thus, for example, reference voltage $V_{dth}$ can be set, so that when electromotive voltage $V_g$ is less than working voltage $V_{sc1}$ of charging portion 104, chopper control boosts electromotive voltage $V_g$. Alternatively, when electromotive voltage $V_g$ is larger than working voltage $V_{sc1}$, chopper control is not carried out and electromotive voltage $V_g$ is charged through normal voltage doubling rectification.

Figure 10A:
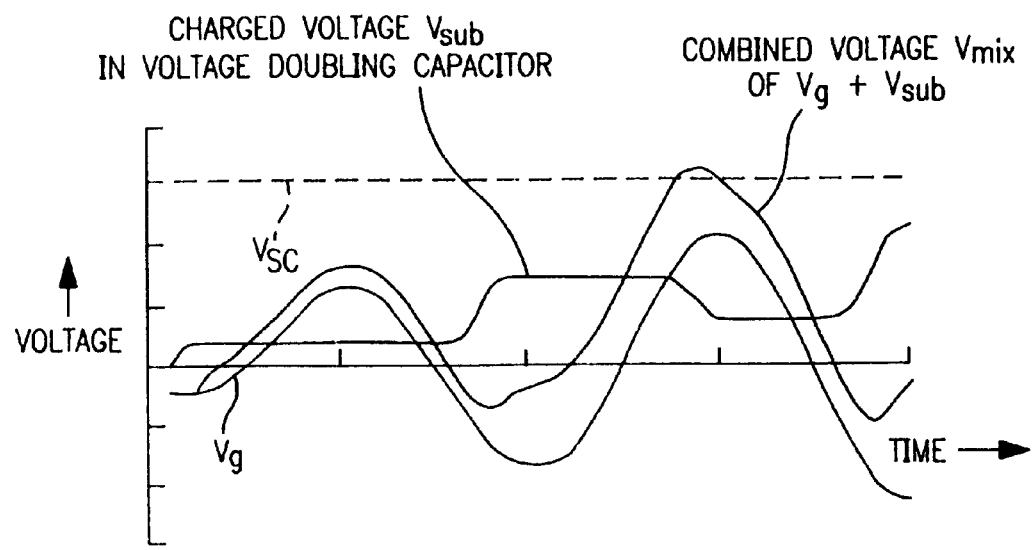
FIGS. 10(a) and 10(b) show a chart showing waveforms of voltages and a charging current produced by the power-generating device constructed in accordance with a second embodiment in the absence of chopper amplification.
Figure 10B:
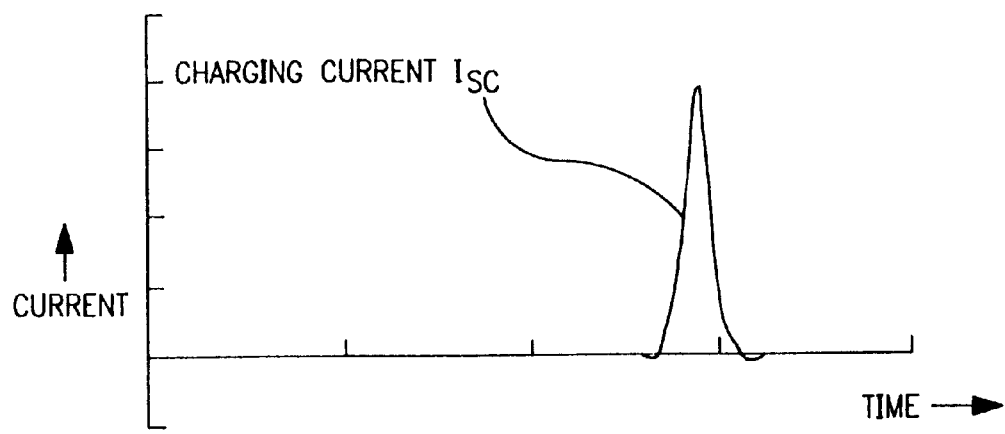

Referring to FIGS. 10(a) and 10(b), waveforms of voltages and charging produced by power-generating device 108 are shown where electromotive voltage $V_g$ is charged through voltage doubling rectification without operating switch 120 and without performing chopper control. Thus, when electromotive voltage $V_g$ generated in dynamo coil 115 provides charged electric power having the same polarity as the lower potential side, voltage $V_g$ increases voltage $V_{sub}$ of voltage doubling capacitor 152. At this time, as is shown in FIG. 9, voltage doubling capacitor 152 is arranged such that the polarity of the terminal connected to the lower potential side of charging portion 104 has a lower potential. Accordingly, when electric power produced by electromotive voltage $V_g$ has the same polarity as the higher potential side, $V_g$ polarity coincides with the polarity of voltage $V_{sub}$ previously charged in voltage doubling capacitor 152, and hence electric power given by a combined voltage $V_{mix}$ of electromotive voltage $V_g$ and charged voltage $V_{sub}$ is therefore applied to charging portion 104. As shown in FIG. 10(b), however, charging current $I_{sc}$ is generated only when combined voltage mix $V_{mix}$ exceeds charged voltage $V_{sc}$. Despite the voltage doubling rectification function, therefore, when combined voltage $V_{mix}$ is not at least equal to charged voltage $V_{sc}$ of charging portion 104, the electric power generated by dynamo 110 is not supplied to charging portion 104, and kinetic energy of rotating weight 111 for driving dynamo 110 is consumed uselessly or impedes conversion of a continuous motion of the user into kinetic energy.

Figure 11:
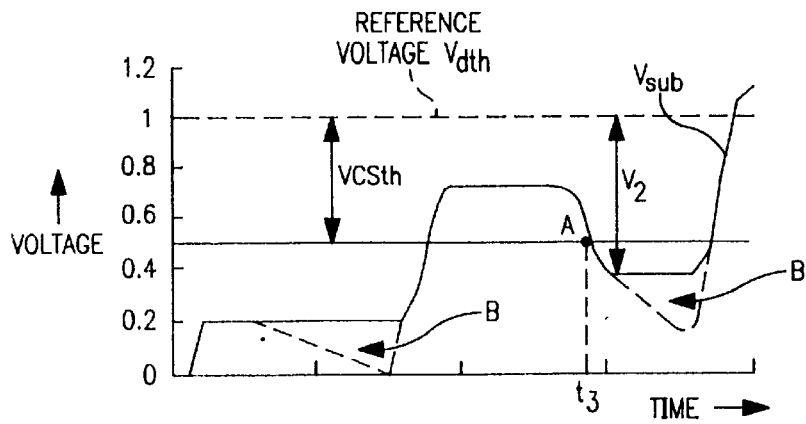
FIG. 11 is a chart showing a waveform of the charged voltage of a voltage doubling capacitor of a power-generating device constructed in accordance with a second embodiment of the invention.

Referring to FIG. 11, the waveform of charged voltage $V_{sub}$ of voltage doubling capacitor 152 is depicted. Assuming that threshold voltage $V_{gsth}$ of n-channel MOSFET 121 in switch 120 is 0.5 V and reference voltage $V_{dth}$ applied to driving MOSFET 143 is 1 V, when the input motion applied to rotating weight 111 is small (i.e., in the range of small values of $V_{sub}$ indicated by region X of the time axis in FIG. 11), charged voltage $V_{sub}$ does not reach a value attained by subtracting threshold $V_{gsth}$ from reference voltage $V_{dth}$. In that range, therefore, the chopper control is turned on and MOSFET 121 is turned on and off cyclically in accordance with the PWM signal for chopper amplification.

On the other hand, when charged voltage $V_{sub}$ increases upon charging in voltage doubling capacitor 152 and exceeds the value attained by subtracting threshold voltage $V_{gsth}$ from reference voltage $V_{dth}$, MOSFET 121 is not activated and chopper amplification is not performed. As a result, when electromotive voltage $V_g$ having the same polarity as the higher potential side is output from dynamo 110, it is subject to the voltage doubling rectification in rectifying portion 102, and the resulting electric power is supplied to charging portion 104. At this time, voltage doubling capacitor 152 is gradually discharged. When the value of charged voltage $V_{sub}$ is reduced below the value attained by subtracting threshold $V_{gsth}$ from reference voltage $V_{dth}$ at a time indicated as t3 in FIG. 11, switch 120 begins chopper amplification and electric power provided by boosted voltage $V_{up}$, rather than electromotive voltage $V_g$, is then supplied to rectifying portion 102. Accordingly, voltage Vmix supplied to charging portion 104 is increased from $(V_g+V_{sub})$ to $(V_{up}+V_{sub})$, and when it exceeds charged voltage $V_{sc}$ of charging portion 104, charging current $I_{sc}$ flows to charge a capacitor 105.

Figure 12A:
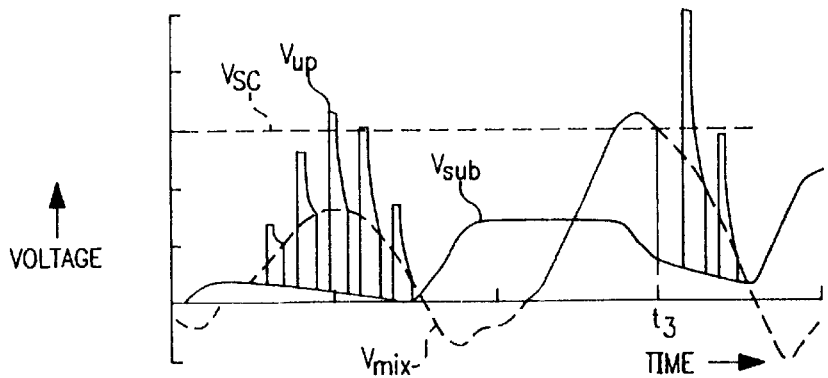
FIGS. 12(a) and 12(b) are charts showing waveforms of voltages and a charging current produced by the power-generating device constructed in accordance with a second embodiment of the invention where chopper amplification is employed.
Figure 12B:
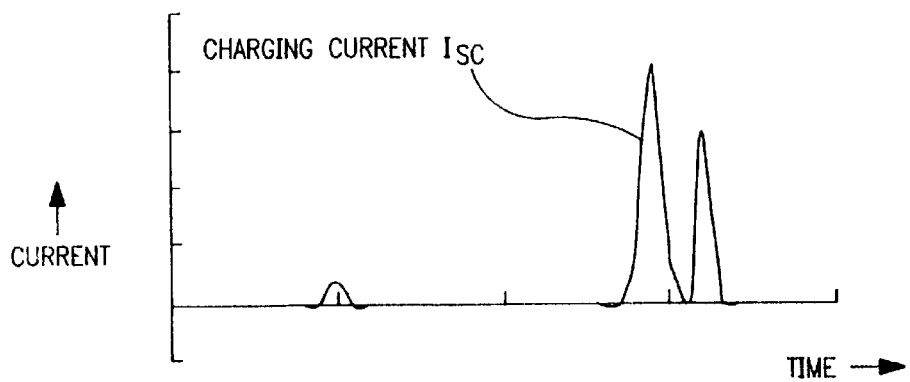

FIGS. 12(a) and 12(b) show respectively waveforms of the voltage supplied to charging portion 104 and charging current $I_{sc}$ flowing into charging portion 104 when power-generating device 108 employs chopper amplification. As is depicted in FIGS. 12(a) and 12(b), if charged voltage $V_{sub}$ of voltage doubling capacitor 152 is low when electric power is supplied to charging portion 104 through voltage doubling rectification, voltage $V_{up}$ is boosted by chopper amplification. As is shown in FIG. 12(a), at times, the output voltage does not exceed charged voltage $V_{sc}$ even with voltage doubling rectification, but the output voltage does exceed charged voltage $V_{sc}$ when chopper boosting is employed. Accordingly, as is apparent by comparing FIGS. 12(b) and 10(b), charging current $I_{sc}$ can be markedly increased by employing chopper control.

Also, as with the first embodiment of the invention explained above, other advantages are produced by such a construction. For example, when a brake is applied to rotating weight 111 at an appropriate time during chopper control, rotating weight 111 can more readily capture kinetic energy.

Further, since charging current $I_{sc}$ is increased under chopper control, the electrical energy that previously had accumulated in voltage doubling capacitor 152, but had not been supplied to charging portion 104, is utilized for charging. As indicated by dotted lines B in FIG. 11, this phenomenon lowers charged voltage $V_{sub}$ of voltage doubling capacitor 152. As a result, charged voltage $V_{sub}$ is reduced to a value below the value attained by subtracting threshold $V_{gsth}$ from reference voltage $V_{dth}$, and chopper amplification is performed for a longer period. Thus, in this embodiment, by employing charged voltage $V_{sub}$ as a parameter for determining whether electromotive voltage $V_g$ can be charged in charging portion 104, it is possible to more reliably determine whether electromotive voltage $V_g$ can be charged in charging portion 104 after electromotive voltage $V_g$ has been subjected to voltage doubling boosting.

Finally, a reference voltage generator 132 for outputting setting voltage $V_{dth}$ is constructed similarly to that explained in the first embodiment above. In this embodiment, therefore, when charged voltage $V_{sc}$ does not reach reference voltage $V_{dth}$, charged voltage $V_{sc}$ is output as reference voltage $V_{dth}$. This arrangement prevents electric power from being consumed by the switching required for chopper control because it permits even a low electromotive voltage $V_g$ to be charged when charged voltage $V_{sc}$ is low. As such, power generation efficiency is further improved.

Figure 13:
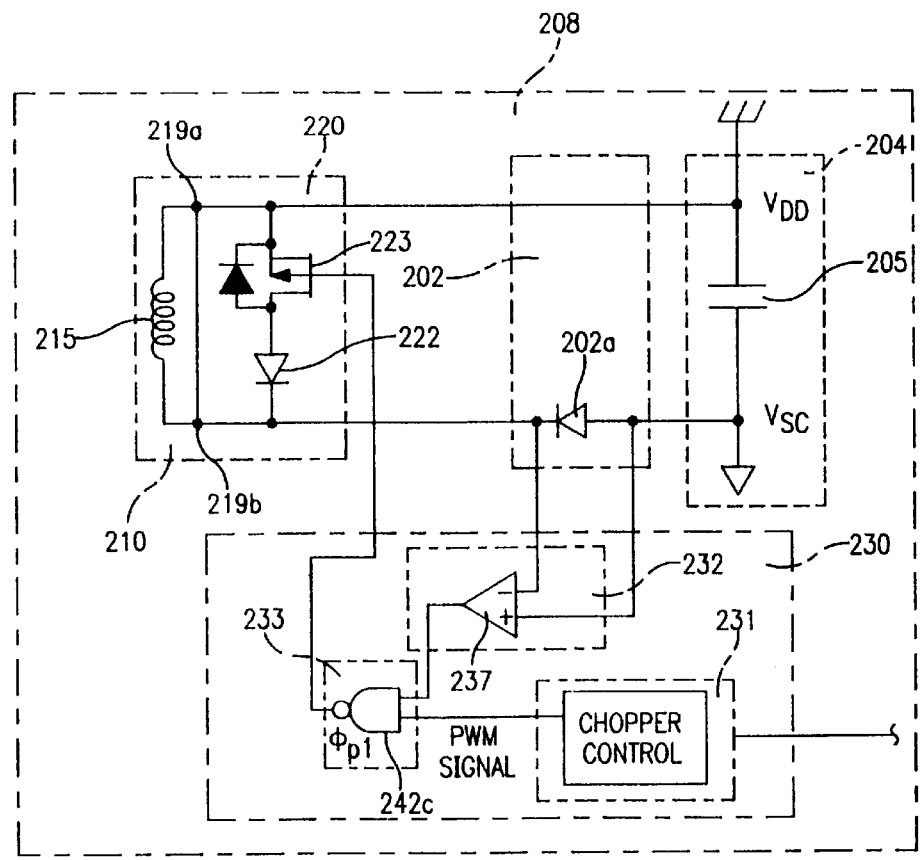
FIG. 13 is a block diagram depicting a power-generating device constructed in accordance with a third embodiment of the present invention.

FIG. 13 depicts a power-generating device constructed in accordance with a third embodiment of the present invention. Components common to those of the above embodiments are denoted by similar reference numerals. A power-generating device 208 of this embodiment can drive a functioning device, such as a clocking device (not shown) by electric power supplied therefrom. Power-generating device 208 of this embodiment is constructed similarly to the embodiments described above, and includes a dynamo 210, a switch 220 capable of short-circuiting between terminals 219a and 219b of a dynamo coil 215 of dynamo 210, a controller 230 for controlling a switch 220, a rectifying portion 202, and a charging portion 204. Switch 220 includes a p-channel MOSFET 223.

While the lower potential side ($V_{ss}$ side) is grounded in the second embodiment, as explained above, in this third embodiment, the higher potential side ($V_{dd}$ side) is grounded to provide a reference potential in power-generating device 208. Other than this difference, power-generating device 208 of this third embodiment is substantially the same construction as power-generating device 8 described in connection with the first embodiment of the invention. Note that, in the following description of this embodiment, the magnitude of voltages are stated in terms of absolute value.

Controller 230 of this embodiment includes a chopper controller 231, which includes a duty setting portion 241 for outputting a PWM signal, a determiner 232 for determining whether charging portion 204 should be charged with electromotive voltage $V_g$ of dynamo 210, and a supply portion 233 for supplying the PWM signal to switch 220 based on the determination of determiner 232. Determiner 232 of this embodiment includes a comparator 237 for detecting a potential across a rectifier diode 202a of rectifying portion 202. When a charging current $I_{sc}$ flows through rectifier diode 202a, an output of comparator 237 is inverted to a low level. As a result, when charging current $I_{sc}$ flows through rectifier diode 202a, rather than supplying the PWM signal for chopper amplification, supply portion 233, which includes a NAND circuit 42c, supplies a high-level drive signal $\phi_{p1}$ for turning off switch 220.

Figure 14:
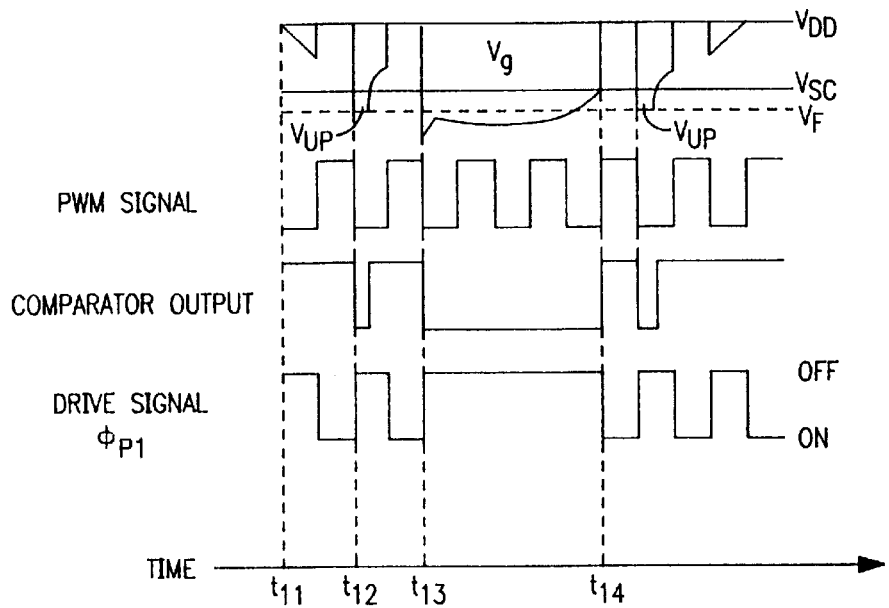
FIG. 14 is a timing chart showing one example of control for the power-generating device constructed in accordance with a third embodiment of the present invention.

FIG. 14 shows, in the form of a timing chart, one example of control for power-generating device 208 of this embodiment. When one cycle of half-wave rectification starts at a time t11, electromotive voltage $V_g$ generated by dynamo 210 is chopper-amplified in accordance with the PWM signal supplied from switch 220. When a resulting boosted voltage $V_{up}$ exceeds a value given by the sum of a charged voltage $V_{sc}$ of charging portion 204 and a forward voltage $V_f$ across rectifier diode 202a at a time t12, charging current $I_{sc}$ flows through rectifier diode 202a. At time t12, therefore, the output of comparator 237 is inverted to a low level to stop the delivery of the PWM signal. However, if the low-level output of comparator 237 shifts from a low-level signal to a high-level signal during the period in which drive signal φp1 is at a high level (i.e., when MOSFET 223 is turned off), the boosting operation is continuously carried out under chopper amplification because no current flows through rectifier diode 202a during the period in which drive signal $\phi_{p1}$ is at a low level (i.e., MOSFET 223 is turned on).

On the other hand, when electromotive voltage $V_g$ becomes higher than charged voltage $V_{sc}$ after a current flows through rectifier diode 202a at a time t13, the output of comparator 237 is inverted to a low level to stop the delivery of the PWM signal, thereby permitting a current to flow through rectifier diode 202a even during the period in which drive signal φp1 is at a low level (MOSFET 23 is turned on). At this time, comparator 237 continues to output a low-level signal thereby inhibiting the PWM signal, and charging current $I_{sc}$ is allowed to flow without chopper control. Accordingly, the output of comparator 237 remains at a low level and chopper amplification is not employed. It is therefore possible to save electric power consumed by operating switch 220 during that period. When, at a time t14, electromotive voltage $V_g$ is reduced to a value below the sum of charged voltage $V_{sc}$ and forward voltage $V_f$, or charged voltage $V_{sc}$ rises to such an extent that the sum of $V_{sc}$ and forward voltage $V_f$ exceeds electromotive voltage $V_g$, comparator 237 outputs a high-level signal. Accordingly, once again, the PWM signal is supplied to switch 220 to resume chopper control, and boosted voltage $V_{up}$ is supplied to charging portion 204.

Thus, in power-generating device 208 of this embodiment, the determination of whether electromotive voltage $V_g$ can be charged in charging portion 204 is based, not on a comparison of voltages such as electromotive voltage $V_g$ and boosted voltage $V_{up}$ with a reference voltage; instead, device 208 relies on a method of judging whether charging current $I_{sc}$ flows. This method also makes it possible to properly perform on-and-off control for chopper control and to prevent unnecessary consumption of electric power by power-generating device 208 due to excessive chopping. Furthermore, as explained previously, because the speed of the rotating weight for driving dynamo 210 is not needlessly reduced, a continuous motion of the user's wrist or the like can be effectively caught for conversion into kinetic energy, thereby increasing the efficiency of power generation.

Of course, the circuit configuration of the determining portion in any of these embodiments is not limited to half-wave rectification. The present invention may also employ power-generating devices that use, for example, other rectifying means known to those practiced in the art, such as, but not limited to, voltage doubling rectification or full-wave rectification.

Figure 15:
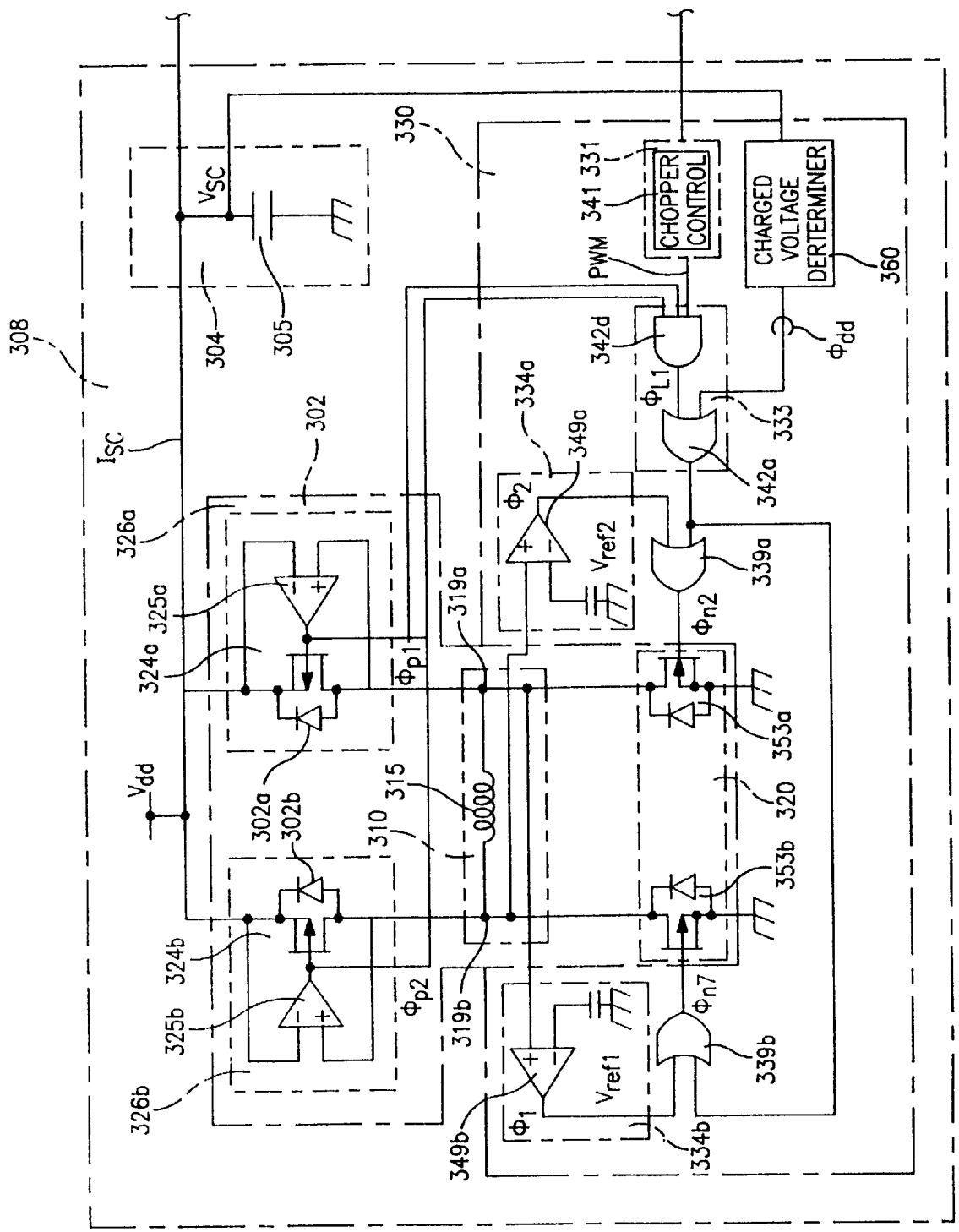
FIG. 15 is a block diagram depicting a power-generating device constructed in accordance with a fourth embodiment of the present invention.

FIG. 15 shows a power-generating device constructed in accordance with a fourth embodiment of the present invention. Components common to those in the above embodiments are denoted by similar reference numerals. A power-generating device 308 of this embodiment is constructed similarly to those embodiments described above, and includes a dynamo 310, a switch 320 capable of short-circuiting between terminals 319a and 319b of a dynamo coil 315 of dynamo 310, a controller 330 for controlling switch 320, a rectifying portion 302, and a charging portion 304.

Rectifying portion 302 of power-generating device 308 of this fourth embodiment consists of a full-wave rectifier circuit, which includes rectifier diodes 302a and 302b arranged on higher potential ($V_{dd}$) side of output terminals $319_a$ and $319_b$, respectively, and rectifier switches 353a and 353b arranged on the lower potential (ground) side of output terminals 319a and 319b, respectively. Rectifier switches 353a and 353b also serve as switch 320 for short-circuiting between output terminal 319a and 319b. Rectifier switches 353a and 353b each include an n-channel MOSFET, which is activated when respective electromotive voltages $V_g$ at output terminals 319b and 319a (measured at the sides opposite the side to which switches 353a and 353b are connected) are determined to be higher than reference voltages $V_{ref1}$ and $V_{ref2}$ by the polarity-determining portions 334a and 334b of controller 330.

P-channel MOSFETs 324a and 324b are connected in parallel to rectifier diodes 302a and 302b in bypassing relation, respectively, and are turned on when respective comparators 325a and 325b determine that diodes 302a and 302b are electrically conducted. Thus, since bypass switches 324a and 324b are turned on when charging current $I_{sc}$ flows through rectifier diodes 302a and 302b, losses due to forward voltages across diodes 302a and 302b can be avoided. In this embodiment, unidirectional units 326a and 326b consist of rectifier diode 302a and bypass switch 324a, and rectifier diode 302b and bypass switch 324b, respectively.

According to this fourth embodiment, the determination as to when charging current $I_{sc}$ is permitted to flow is based on outputs of comparators 325a and 325b of unidirectional units 326a and 326b. Therefore, comparator outputs $\phi_{p1}$ and $\phi_{p2}$ function as the determiner described in previous embodiments. That is, the outputs determine whether the value of electromotive voltage $V_g$ is of value great enough to permit voltage $V_g$ to charge charging portion 304.

Referring to FIG. 15, controller 330 employs the outputs of comparators as unidirectional elements to function as a determiner. In addition, controller 30 includes a chopper controller 331 for supplying a PWM signal and a supply portion 333. Controller 330 further includes polarity-determining portions 334a and 334b for determining the polarity of electromotive voltage $V_g$ output from dynamo 310 by using the above-mentioned comparators 349a and 349b, and a charged voltage-determiner 360 capable of determining whether charged voltage $V_{sc}$ is an overvoltage.

Figure 16:
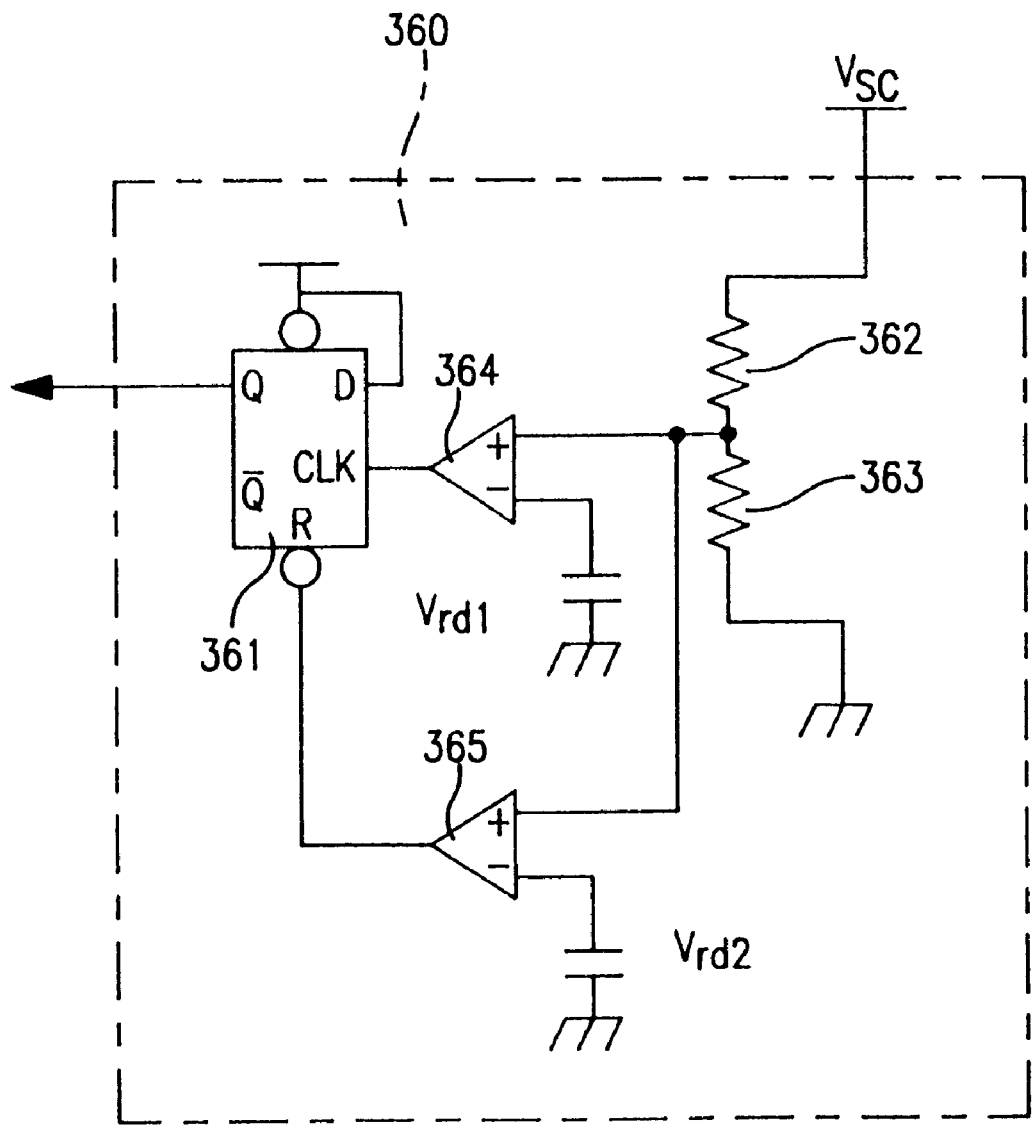
FIG. 16 is a diagram showing one example of circuit for an overcharged voltage determining portion of a power-generating device constructed in accordance with a fourth embodiment of the present invention.

Charged-voltage-determiner 360 determines whether the charging of electricity in charging portion 304 has progressed to such an extent that charged voltage $V_{sc}$ reaches the withstand voltage of a capacitor 305 or the withstand voltage of a functioning device, such as a clocking device (not shown) connected to power-generating device 308. Charged-voltage-determiner 360 may consist of, for example, the circuit shown in FIG. 16. The circuit shown in FIG. 16 employs a D flip-flop 361. More specifically, charged voltage $V_{sc}$ is divided by resistances 362 and 363, and the divided voltage is compared in a comparator 364 with a reference voltage $V_{rd1}$, which is adapted for determining whether the charged voltage is an excessive voltage, and, if so, to stop the charging process. Further, the divided voltage is compared in a comparator 365 with a reference voltage $V_{rd2}$, which is adapted for determining whether the charged voltage is not an excessive voltage, and, if so, charging is resumed.

When divided charged voltage $V_{sc}$ reaches reference voltage $V_{rd1}$, flip-flop 361 is set to output a high-level signal, whereupon MOSFETs 353a and 353b of switch 20, which serve as part of rectifying portion 302, are turned on through supply portion 333. Activating MOSFETs 353a and 353b short-circuits output terminals 319a and 319b of dynamo 310 thereby enabling dynamo 310 to stop electric power from being output therefrom. Accordingly, even if kinetic energy is applied to rotating weight 311, electric power is not supplied to charging portion 304. As a result, charged voltage $V_{sc}$ is prevented from rising. On the other hand, when the electric power in charging portion 304 is consumed by the functioning device (not shown), and charged voltage $V_{sc}$ is reduced such that the divided voltage is lower than reference voltage $V_{rd2}$, flip-flop 361 is reset. Thereafter, MOSFETs 353a and 353b are freed to be used for rectification or chopper amplification.

Supply portion 333 supplies the PWM signal to switch 320, and includes a three-input AND circuit 342d to which are applied the PWM signal and the outputs of comparators 325a and 325b of unidirectional units 326a and 326b. When comparator 325a or 325b detects charging current $I_{sc}$ flowing through corresponding diode 302a or 302b, comparator output $\phi_{p1}$ and/or $\phi_{p2}$ is a low-level signal, which prevents the PWM signal from being output as a drive signal $\phi_{L1}$. Drive signal $\phi_{L1}$ is input to an OR circuit 342e along with an output signal $\phi_{dd}$ of charged-voltage-determiner 360, thereby producing a drive signal $\phi_{L2}$, which is a high level signal if one of the two inputs to OR circuit 342e ($\phi_{dd}$ or $\phi_{L1}$) becomes a high-level signal.

Drive signal $\phi_{L2}$ is input to OR circuits 339a and 339b along with respective outputs $\phi_2$, $\phi_1$ of polarity-determining portions 334a and 334b. These outputs are used to enable associated MOSFETs 353a and 353b to perform the rectifying operation. As a result, MOSFETs 353a, 353b are turned off so as not to rectify, and are employed in chopper control to output voltage $V_{up}$ boosted by chopper amplification, or are turned on to short-circuit output terminals 319a and 319b to prevent power generation when charged voltage $V_{sc}$ is an overvoltage.

Figure 17:
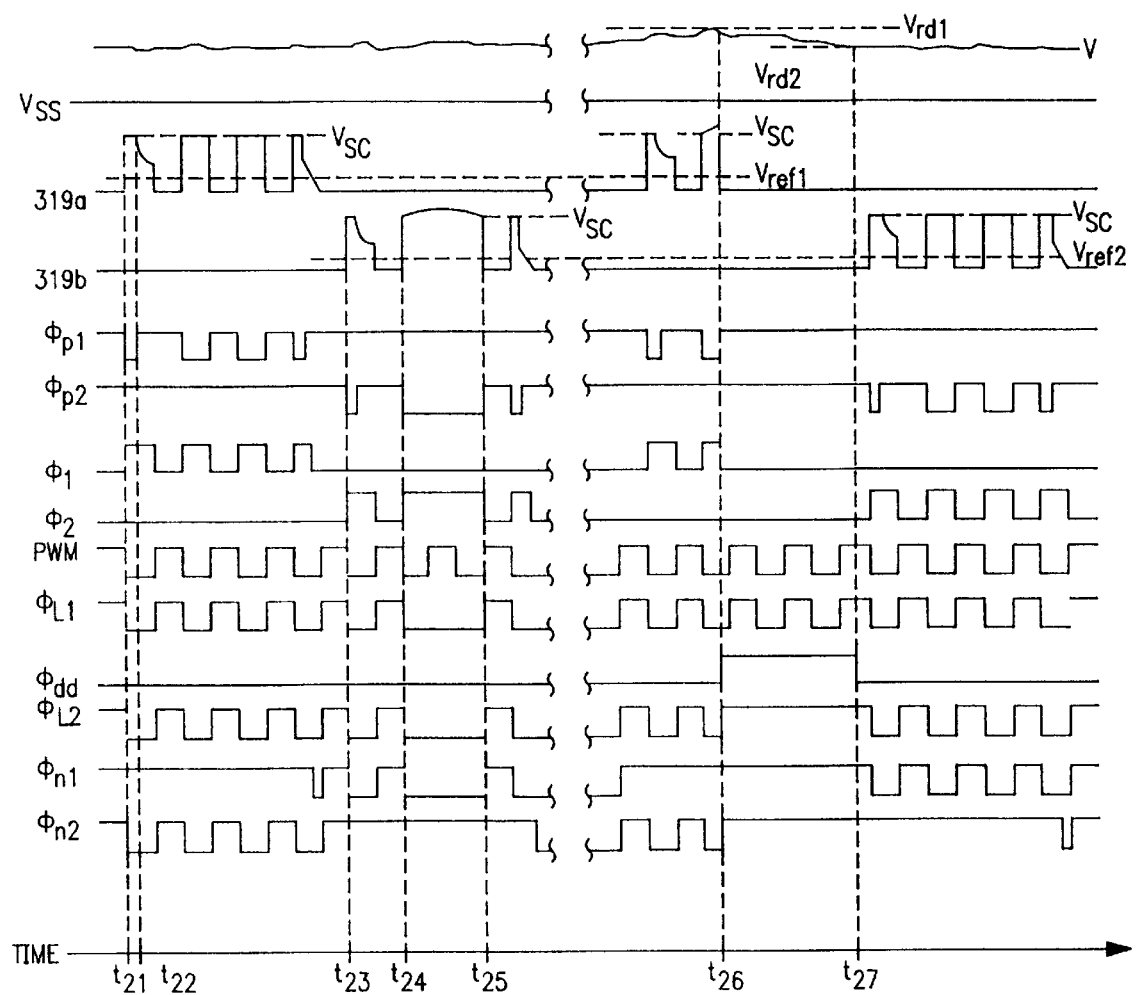
FIG. 17 is a timing chart showing one example of control for the power-generating device constructed in accordance with a fourth embodiment of the present invention.

FIG. 17 shows, in the form of a timing chart, one example of a control for a power-generating device 308 of this embodiment. At a time t21, a rectifying cycle starts with electromotive voltage $V_g$ having one polarity. When the output voltage at dynamo terminal 319a reaches reference voltage $V_{ref1}$, output $\phi_1$ of comparator 349b of polarity determining portion 334b outputs a high-level signal, causing a drive signal $\phi_{n1}$ for switch 353b to output at a high level. Switch 353b is thereby turned on to form the rectifier 302 for rectifying electric power given by electromotive voltage $V_g$ having one polarity. Rectifier 302 of power-generating device 308 determines the polarity of electromotive voltage $V_g$ with polarity determining portions 334a and 334b. Full-wave rectification, which in the past has been performed through a bridge made up of four rectifier diodes, can be performed with switches 353a and 353b. It is therefore possible to reduce losses caused by forward voltages across the diodes and to increase the efficiency of charging by dynamo 310.

At this time, signal $\phi_{n2}$ for driving the other of the paired rectifier switches 353a repeats turning on and off cyclically in accordance with the PWM signal. As a result, output terminals 319a and 319b of the dynamo are short-circuited repeatedly through switches 353a and 353b, thereby carrying out chopper amplification. Accordingly, a boosted voltage appears at output terminal 319a. When the boosted voltage exceeds charged voltage $V_{sc}$ at a time t22, a charging current flows through rectifier diode 302a. At the same time, output $\phi_{p1}$ of comparator 325a of unidirectional unit 326a turns to a low level and unidirectional unit 326a is turned on. Accordingly, the charging current can be supplied while bypassing rectifier diode 302a, thereby eliminating a loss caused by the forward voltage across diode 302a. Therefore, if a boosted voltage $V_{up}$ having a value slightly greater than charged voltage $V_{sc}$ is produced through chopper amplification, the resulting electric power can be charged in charging portion 304. When unidirectional unit 326a is turned on, the supply of the PWM signal from supply portion 333 is stopped. However, if the output of unidirectional unit 326a is shifted from an off-level to an on-level during the period in which the PWM signal is at a low level (MOSFET 353a or 353b is turned off), chopper boosting is continuously performed because electromotive voltage $V_g$ does not reach charged voltage $V_{sc}$ during the period in which the PWM signal is outputted at a high level (MOSFET 353a or 353b is turned on).

At a time t23, a rectifying cycle starts for electric power given by electromotive voltage $V_g$ having the opposite polarity. When electromotive voltage $V_g$ at output terminal 319b reaches reference voltage $V_{ref2}$, comparator output $\phi_2$ of polarity determining portion 334a turns to a high level, causing a drive signal $\phi_{n2}$ for switch 353a to have a high level. Switch 353a is thereby turned on to form the rectifier circuit. Accordingly, drive signal $\phi_{n1}$ for switch 353b on the opposite side cyclically turns on and off in accordance with the PWM signal, thereby carrying out the chopper control.

At a time t24, a charging current flows due to a voltage boosted through chopper amplification, whereupon unidirectional unit 326b is turned on. Therefore, output $\phi_{p2}$ of comparator 325b of unidirectional unit 326b turns to a low level, whereby the PWM signal is stopped and both drive signals $\phi_{L1}$ and $\phi_{L2}$ are both outputted at a low level. Hence, drive signal $\phi_{n1}$ for switch 353a turns to a low level and chopper control is prevented. This condition continues for a period during which electromotive voltage $V_g$ is greater than charged voltage $V_{sc}$, and chopper control is not performed. When electromotive voltage $V_g$ falls below charged voltage $V_{sc}$ a time t25, unidirectional unit 325b is turned on and chopper control is resumed.

Following the timeline of FIG. 17, when charged voltage $V_{sc}$ reaches reference voltage $V_{rd1}$ adapted for determining at a time t26 whether charged voltage $V_{sc}$ is an overvoltage, signal $\phi_{dd}$ from the overvoltage determiner 360 turns to a high level. (Note that, although the divided voltage of charged voltage $V_{sc}$ is used for comparison in this embodiment, $V_{sc}$ is directly used as a basis for comparison for the sake of simplicity.) Therefore, drive signal $\phi_{L2}$ is output at a high level, whereupon drive signals $\phi_{n1}$ and $\phi_{n2}$ also are output at a high level. Accordingly, switches 353a and 353b are turned on to short-circuit output terminals 319a and 319b. As a result, no electric power is output from output terminals 319a and 319b, and charging is ceased.

As charged voltage $V_{sc}$ gradually lowers over time, at a time t27 when $V_{sc}$ reaches reference voltage $V_{rd2}$, charging is resumed, and signal $\phi_{dd}$ from overvoltage determiner 360 outputs a low level signal. Drive signals $\phi_{n1}$ and $\phi_{n2}$ take respective values in accordance with the other conditions. Accordingly, when electromotive voltage $V_g$ is low, chopper amplification is carried out, and charging is resumed with the boosted voltage.

It is a matter of course that, while the forth embodiment is constructed to carry out chopper amplification through switching made by p-channel MOSFETs on the $V_{ss}$ side, the configuration of the disclosed control circuit may be reversed to an inverted position to produce power-generating device 308 of the type using p-channel MOSFETs on the $V_{dd}$ side for switching.

With power-generating device 308 according to the present invention, as explained above, both ends of dynamo coil 315 of dynamo 310 are cyclically connected and disconnected to provide a voltage boosted through chopper amplification. Therefore, even when an input to dynamo 310 is small and electromotive voltage $V_g$ is insufficient to charge charging portion 304, charging portion 304 can be charged with chopper-boosted voltage $V_{up}$ if it is boosted to a sufficient level. Accordingly, even when an input to dynamo 310 is small, kinetic energy of the input can be converted into electrical energy and stored. Hence, power-generating device 308 is provided having high power generation efficiency and high charging efficiency. Further, selecting chopper boosting as a boosting method provides another advantage in that an appropriate charging brake can be applied to the rotating weight. Experiments performed by the inventors of this application prove that, as a result of using, for example, the power-generating device with full-wave rectification and chopper amplification, as described in the fourth embodiment, a charging current increases by twenty times or more as compared to a power generator having full-wave rectifier circuit using a diode bridge.

Of course, the above-explained circuits of the power-generating device according to the present invention are given only by way of example, and the present invention is not limited to those circuits. Also, the power-generating device of the present invention is not limited in its applications to a wristwatch, but are applicable to various kinds of equipment, such as devices fitted on a user's legs or mounted on moving bodies, such as vehicles. Indeed, the present invention can be applied wherever electric power may be generated by converting kinetic energy captured from vibrations or the like of moving bodies to electric energy. The functioning device capable of operating with electric power supplied from the power-generating device of the present invention is not limited to the clocking device mentioned above, but includes, for example, information terminals such as pagers, telephones, wireless units, hearing aids, pedometers, calculators, and electronic pocketbooks, as well as IC cards and radio receivers. By employing the power-generating device of the present invention in these types of portable equipment, it is possible to efficiently generate electric power by catching the motion of the human body. Further, by doing so, battery consumption may be reduced, or the battery itself may be eliminated entirely. Accordingly, a user can use these types of portable equipment without worrying about when the battery will die or if the loss of battery power will cause the loss of data stored in memory. Further, with this invention, electronic equipment may be used where batteries or chargers are hard to obtain, or in cases where it is difficult to replace batteries because of disasters or the like.

As described above, according to the power-generating device of the present invention, even when the electromotive voltage generated in the dynamo coil is too small to exceed the charged voltage of the charging portion, it can be boosted by carrying out chopper control such that a boosted voltage can be charged in the charging portion. Such a device results in improved power generation efficiency. Further, even when a motion of the rotating weight for applying mechanical power to the dynamo is a continuous motion, the rotating weight is prevented from overshooting or being subject to an unnecessary charging brake. As a result, the power-generating device of the invention is capable of efficiently converting acquired kinetic energy into electrical energy.

By providing a function to determine whether the charging portion can be charged with the electromotive voltage without being boosted, unnecessary chopper control can be avoided, and electric power otherwise consumed by switching operation or the like can be saved. This leads to further improved power generation efficiency.

Further, the switch for carrying out chopper control can be designed to function also as a bypassing circuit for overcoming an overly charged state, and a number of functions can be realized with simplified circuits. Also, by employing a unidirectional unit, a loss caused by the forward voltage across a diode can be reduced, which also contributes to providing higher efficiency power-generating device having a higher charging efficiency.

Thus, by using the power-generating device of the present invention, charging of electricity can be achieved very efficiently by catching the user's motion or the like. Therefore, if the power-generating device of the present invention is employed, for example, in a power supply for clocking devices, the clocking device is maintained in a functioning state, while the user is carrying it, even when the user's motion is small. Consequently, a clocking device with good operating performance and high reliability can be provided.

It will thus be seen that the objects set forth above, among those made apparent from the preceding description are efficiently obtained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall there between.

What is claimed is:

1. A power-generating device comprising:
   a power generator including a dynamo coil, said dynamo coil having at least two output terminals, said power generator generating an output induced in said dynamo coil, said output having a voltage;
   a switch constructed to short-circuit said at least two output terminals of said dynamo coil;
   a controller constructed to control said switch;
   a rectifier constructed to rectify said output of said power generator to produce a rectified output;
   a charging portion constructed to accumulate said rectified output; and
   said controller having a chopper control function constructed to cyclically turn said switch on and off such that said output voltage may be selectively chopper-amplified.

2. The power-generating device according to claim 1, wherein said controller includes a polarity determiner constructed to determine the polarity of said output of said power generator.

3. The power-generating device according to claim 1, wherein said switch is constructed to permit current to flow in only one direction.

4. The power-generating device according to claim 1, wherein said rectifier is constructed to perform full-wave rectification by a combination of rectifier diodes and rectifier switches connected upstream and downstream of said at least two output terminals of said power generator, one of said two output terminals having a lower potential than the other; and wherein said controller has a polarity determiner constructed to determine the polarity of said power generator voltage, and to permit said rectifier coupled to the lower potential of said output terminals to serve as said switch.

5. The power-generating device according to claim 1, wherein said rectifier includes a rectifier diode and a bypass switch constructed to bypass said rectifier diode.

6. A charging method for accumulating electric power generated by a power generator, the electric power being accumulated by a charging portion, said method comprising chopper-amplifying the output of the power generator where a power generator voltage is less than a voltage of said charging portion.

7. The charging method according to claim 6, wherein said chopper-amplification is produced by cyclically turning on and off a switch capable of short-circuiting output terminals of the power generator.

8. The charging method according to claim 7, wherein, in said chopper amplifying step, said switch is operated by using at least a portion of an oscillation signal of a clocking portion, wherein said clocking portion operates by electric power supplied by at least said charging portion.

9. A power-generating device comprising:
   a power generator including a dynamo coil, said dynamo coil having at least two output terminals, said power generator generating an output induced in said dynamo coil, said output having a voltage;
   a switch coupled to said power generator for short-circuiting said at least two output terminals of said dynamo coil;
   a rectifier coupled to said power generator for rectifying the output of said power generator;
   a charging portion coupled to said rectifier for accumulating an output from the rectifier; and,
   a controller coupled to said switch and performing a chopper control function for cyclically activating and deactivating said switch such that said output voltage may be selectively chopper-amplified.

10. The power-generating device according to claim 9, wherein said controller includes a polarity determiner coupled to said power generator for determining the polarity of said output of said power generator.

11. The power-generating device according to claim 9, wherein said switch is constructed to permit current flow in only one direction.

12. The power-generating device according to claim 9, wherein said rectifier is a full wave rectifier comprising a first and a second rectifier diode, each coupled to the high potential side of said at least two output terminals of said power generator, and a first and a second rectifier switch, each coupled to the lower potential side of said at least two output terminals of said power generator, and wherein said controller comprises a polarity determiner for determining the polarity of said power generator voltage and causing one of said first and second rectifier switches to function as said switch.

13. The power-generating device according to claim 9, wherein said rectifier includes a rectifier diode and a bypass switch for bypassing said rectifier diode.

14. A clocking device, comprising:
   a power-generating device including:
      a power generator including a dynamo coil, said dynamo coil having at least two output terminals, said power generator generating an output induced in said dynamo coil, said output having a voltage;
      a switch coupled to said power generator for short-circuiting said at least two output terminals of said dynamo coil;
      a rectifier coupled to said power generator for rectifying the output of said power generator;
      a charging portion coupled to said rectifier for accumulating an output from the rectifier;
      a controller coupled to said switch and performing a chopper control function for cyclically activating and deactivating said switch such that said output voltage may be selectively chopper-amplified; and
   a clocking portion constructed to operate by electric power supplied from said charging portion.

15. The clocking device according to claim 14, wherein said clocking portion includes an oscillation signal, and wherein said controller performs said chopper function by using at least a portion of said oscillation signal of said clocking portion.

16. A clocking device, comprising:
   a power-generating device including:
      a power generator including a dynamo coil, said dynamo coil having at least two output terminals, said power generator generating an output induced in said dynamo coil, said output having a voltage;
      a switch constructed to short-circuit said at least two output terminals of said dynamo coil;
      a controller constructed to control said switch;
      a rectifier constructed to rectify said output of said power generator to produce a rectified output;
      a charging portion constructed to accumulate said rectified output;
      said controller having a chopper control function constructed to cyclically turn said switch on and off such that said output voltage may be selectively chopper-amplified; and,
   a clocking portion constructed to operate by electric power supplied from said charging portion.

17. The clocking device according to claim 16, wherein said clocking portion includes an oscillation signal, and wherein said controller is constructed to perform said chopper control by using at least a portion of said oscillation signal of said clocking portion.

18. A power generating device comprising:
   a power generator including a dynamo coil, said dynamo coil having at least two output terminals, said power generator generating an output induced in said dynamo coil, said output having a voltage;
   a switch constructed to short-circuit said at least two output terminals of said dynamo coil;
   a controller constructed to control said switch;
   a rectifier constructed to rectify said output of said power generator to produce a rectified output;
   a charging portion constructed to accumulate said rectified output; and
   said controller having a chopper control function constructed to cyclically turn said switch on and off, wherein said controller includes a determiner constructed to determine the voltage of said power generator output, and to stop said chopper control function when said charging portion can be charged with said output of said power generator.

19. The power-generating device according to claim 18, wherein said determiner is constructed to compare said output voltage of said power generator with a voltage of said charging portion.

20. The power-generating device according to claim 18, wherein said determiner is constructed to compare said power generator output voltage with a first reference voltage, at which said power generator output voltage is deemed capable of charging said charging portion.

21. The power-generating device according to claim 18, wherein said determiner is constructed to determine said power generator output voltage by detecting a voltage drop in a power supply circuit with respect to said charging portion.

22. A power generating device comprising:

a power generator including a dynamo coil, said dynamo coil having at least two output terminals, said power generator generating an output induced in said dynamo coil, said output having a voltage;

a switch constructed to short-circuit said at least two output terminals of said dynamo coil;

a controller constructed to control said switch;

a rectifier constructed to rectify said output of said power generator to produce a rectified output;

a charging portion constructed to accumulate said rectified output; and said controller having a chopper control function constructed to cyclically turn said switch on and off, wherein said controller includes a determiner constructed to determine a voltage of said charging portion and to activate said switch when said charging portion voltage exceeds a second setting voltage, beyond which said charging portion voltage is judged to be excessive.

23. A charging method for accumulating electric power by a charging portion, said electric power generated by a power generator, said method comprising chopper-amplifying the output of the power generator where a power generator voltage is less than a voltage of said charging portion, with said chopper-amplification being produced by cyclically turning on and off a switch capable of short-circuiting output terminals of the power generator, and turning on said switch when said voltage of said charging portion is deemed excessive.

24. A power-generating device comprising:

a power generator including a dynamo coil, said dynamo coil having at least two output terminals, said power generator generating an output induced in said dynamo coil, said output having a voltage;

a switch coupled to said power generator for short-circuiting said at least two output terminals of said dynamo coil;

a rectifier coupled to said power generator for rectifying the output of said power generator;

a charging portion coupled to said rectifier for accumulating an output from the rectifier; and, a controller coupled to said switch and performing a chopper control function for cyclically activating and deactivating said switch, wherein said charging portion includes a capacitor and said controller includes a determiner coupled to said power generator for determining the level of voltage of said power generator output and for ceasing said chopper control function when said voltage from said power generator is sufficient to charge said capacitor.

25. The power-generating device according to claim 24, wherein said determiner compares said output voltage of said power generator with a capacitor charged voltage accumulated by said capacitor, and cease said chopper control function when the value of said charged voltage is less than the output voltage of said power generator.

26. The power-generating device according to claim 24, wherein said determiner compares said power generator output voltage with a first reference voltage, and ceases said chopper control function when said power generator output voltage is greater than said first reference voltage.

27. The power-generating device according to claim 24, further comprising a power supply circuit wherein said determiner determines said power generator output voltage by detecting a voltage drop in the power supply circuit.

28. A power-generating device comprising:

a power generator including a dynamo coil, said dynamo coil having at least two output terminals, said power generator generating an output induced in said dynamo coil, said output having a voltage;

a switch coupled to said power generator for short-circuiting said at least two output terminals of said dynamo coil;

a rectifier coupled to said power generator for rectifying the output of said power generator;

a charging portion coupled to said rectifier for accumulating an output from the rectifier; and, a controller coupled to said switch and performing a chopper control function for cyclically activating and deactivating said switch, wherein said charging portion includes a capacitor and said controller includes a determiner, coupled to said capacitor and said switch, for determining a voltage of said capacitor and for activating said switch when said capacitor voltage exceeds a second reference voltage to protect said capacitor from an overvoltage.

* * * * *